United States Patent
Tanaka et al.

(10) Patent No.: US 6,175,401 B1
(45) Date of Patent: Jan. 16, 2001

(54) LIQUID CRYSTAL DISPLAY DEVICE HAVING A LIQUID CRYSTAL LAYER WHICH CONTAINS LIQUID CRYSTAL MOLECULES IN A PLURALITY OF ALIGNMENT STATE AND METHOD FOR DRIVING THE SAME

(75) Inventors: Tomio Tanaka, Tokyo; Tetsushi Yoshida, Kanagawa-ken; Jun Ogura, Fussa; Manabu Takei, Sagamihara, all of (JP)

(73) Assignee: Casio Computer Co., Ltd., Tokyo (JP)

( * ) Notice: Under 35 U.S.C. 154(b), the term of this patent shall be extended for 0 days.

(21) Appl. No.: 09/067,914

(22) Filed: May 1, 1998

(30) Foreign Application Priority Data

| May 2, 1997 | (JP) | 9-127802 |
| May 2, 1997 | (JP) | 9-127803 |
| May 2, 1997 | (JP) | 9-127804 |
| May 2, 1997 | (JP) | 9-127805 |
| May 2, 1997 | (JP) | 9-127806 |
| May 8, 1997 | (JP) | 9-132988 |

(51) Int. Cl.$^7$ .................................................. G02F 1/141
(52) U.S. Cl. .......................... 349/172; 349/173; 349/174
(58) Field of Search ........................ 349/172, 173, 349/174, 37

(56) References Cited

U.S. PATENT DOCUMENTS

| 4,796,980 | * | 1/1989 | Kaneko et al. | 349/85 |
| 4,906,074 | * | 3/1990 | Yamazaki et al. | 349/184 |
| 4,941,736 | * | 7/1990 | Taniguchi et al. | 349/173 |
| 5,151,804 | * | 9/1992 | Verhulst et al. | 349/173 |
| 5,353,136 | * | 10/1994 | Escher et al. | 349/173 |
| 5,552,911 | * | 9/1996 | Okada et al. | 349/106 |
| 5,631,752 | * | 5/1997 | Tanaka | 349/173 |
| 5,764,328 | * | 6/1998 | Kawada et al. | 349/173 |
| 5,847,799 | * | 12/1998 | Tanaka et al. | 349/174 |
| 5,938,973 | * | 8/1999 | Motoyama et al. | 252/299.65 |

* cited by examiner

Primary Examiner—Kenneth Parker
(74) Attorney, Agent, or Firm—Frishauf, Holtz, Goodman, Langer & Chick, P.C.

(57) ABSTRACT

A liquid crystal material which exhibits an antiferroelectric phase while the liquid crystal material is in a bulk state, is sealed between substrates. The liquid crystal layer sealed between the substrates exhibits a mixed phase wherein the liquid crystal layer contains liquid crystal molecules aligned in a plurality of alignment states which differ from each other in the alignment order of the liquid crystal molecules forming adjoining smectic layers. The direction of the director of the liquid crystal layer varies continuously in accordance with the polarity and magnitude of a voltage applied to the liquid crystal layer. Gradation display can be achieved by arranging polarization plates such that the substrates are sandwiched therebetween.

21 Claims, 29 Drawing Sheets

(4 of 29 Drawing Sheet(s) Filed in Color)

FIG.14A GATE SIGNAL
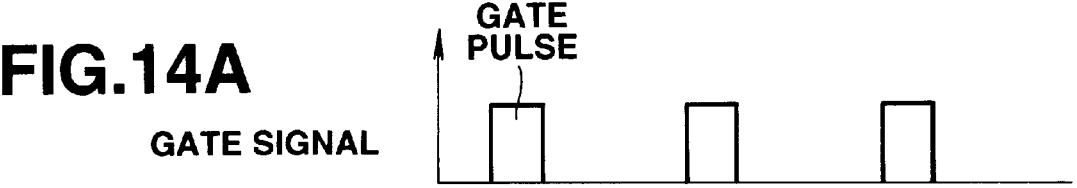
FIG.14B DATA SIGNAL
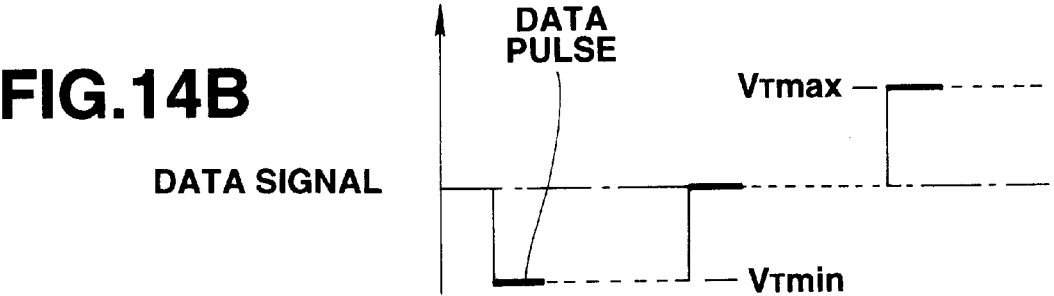
FIG.14C TRANSMITTANCE
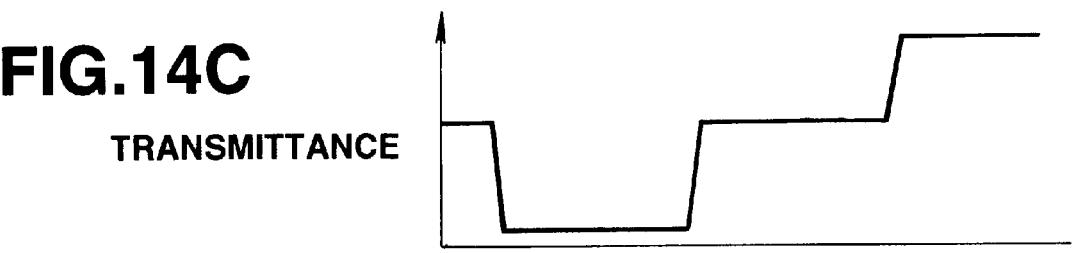

LIQUID CRYSTAL DISPLAY DEVICE HAVING A LIQUID CRYSTAL LAYER WHICH CONTAINS LIQUID CRYSTAL MOLECULES IN A PLURALITY OF ALIGNMENT STATE AND METHOD FOR DRIVING THE SAME

BACKGROUND OF THE INVENTION

1. Field of the Invention

The present invention relates to an LCD (Liquid Crystal Display) device using an AFLC (AntiFerroelectric Liquid Crystal), and more particularly to a display device which is capable of performing gradation display and a method for driving the display device.

2. Description of the Related Art

An LCD device, which uses an LC material whose molecules have spontaneous polarizations, and which drives the LC molecules through utilization of interactions between an electric field and the spontaneous polarizations of the LC molecules in order to perform a display operation, has received attention due to its quicker response and wider angle of visibility than those of an TN liquid crystal display device using a nematic liquid crystal.

Known FLC display devices include an FLC display device which uses an FLC and an AFLC display device which uses an AFLC.

An AFLC display device displays images by utilization of three stable alignment states of an AFLC.

This matter will now be discussed in more detail. An AFLC has three stable alignment states in which; (1) when a voltage equal to or higher than a first threshold value is applied to the LC, the LC exhibits a first ferroelectric phase wherein the LC molecules are aligned in a first direction or a second ferroelectric phase wherein the LC molecules are aligned in a second direction, in accordance with the polarity of the applied voltage; and (2) when a voltage equal to or lower than a second threshold value less than the first threshold value is applied to the AFLC, the liquid crystal exhibits an antiferroelectric phase which differs in the alignment of the LC molecules from the first and second ferroelectric phases. Determining the directions of the transmission axes of a pair of polarization plates arranged one on either side of an LCD device, on the basis of the optical axis of a liquid crystal layer while in the antiferroelectric phase, enables a display device to display images, with control of the light transmittance in accordance with the applied voltage.

Even when a variation occurs in the applied voltage, an AFLC stays in the first/second ferroelectric phase or the antiferroelectric phase, as far as the value of the applied voltage lies in a range between the first and second threshold values. This property is known as a memory property. A conventional AFLC display device is driven in a simple matrix mode through utilization of this memory property.

The memory property of an AFLC is determined by a difference in magnitude between a voltage, which causes a phase transition from the first/second ferroelectric phase to the antiferroelectric phase in the liquid crystal, and a voltage which causes a phase transition from the antiferroelectric phase to the first/second ferroelectric phase in the liquid crystal. The greater the difference between those voltages, the greater will be the memory property. In other words, the greater the hysteresis of the optical characteristic of the liquid crystal, the greater the memory property.

Due to this, a conventional AFLC display device which is driven in a simple matrix mode uses, as an AFLC, such a liquid crystal that the difference between the magnitudes of the above-described voltages is large.

However, the light transmittance of the conventional AFLC display device, which uses an AFLC having an excellent memory property, can not be controlled. That is, the control of a display gradation is almost impossible and multi-gradation display cannot be realized.

SUMMARY OF THE INVENTION

It is accordingly an object of the present invention to provide an LCD device which can achieve high-contrast gradation display.

According to the first aspect of the present invention having the above-described object, there is provided a liquid crystal display device comprising:

a first substrate on which first electrodes are formed;

a second substrate on which a second electrode is formed facing the first electrodes;

a liquid crystal layer formed of a smectic liquid crystal which exhibits a mixed phase when the liquid crystal is sealed between the first and second substrates, the liquid crystal in the mixed phase containing liquid crystal molecules aligned in a plurality of alignment states which differ from each other in an alignment order of liquid crystal molecules forming adjoining smectic layers; and director changing means for changing a director of the liquid crystal layer by controlling the alignment of liquid crystal molecules exhibiting the mixed phase.

According to the above-described structure, the liquid crystal layer exhibits a mixed phase in which the liquid crystal layer contains liquid crystal molecules aligned in a plurality of alignment states which differ from each other in the alignment order of the liquid crystal molecules forming adjoining smectic layers. In the mixed phase, the direction of the director of the liquid crystal layer varies continuously in accordance with the applied voltage and its polarity. By providing the liquid crystal display device with polarization plates, an electro-optical characteristic exhibiting no hysteresis and which changes linearly over a wide range can be attained. According to this characteristic, the applied voltage determines the display gradation. Therefore, by applying a voltage corresponding to the desired gradation to the liquid crystal layer, an image can be displayed at the desired gradation.

The plurality of alignment states differ from each other in the alignment of liquid crystal molecules which are in a plane substantially parallel with the first and second substrates.

An electric field applied between the first and second substrates induces the mixed phase. In this case, it is preferred that the interactions between smectic layers contained in the liquid crystal layer be stronger than the aligning forces of alignment films formed on the inner surfaces of the substrates in order to align the liquid crystal molecules in a predetermined direction.

In the mixed phase, the liquid crystal contains liquid crystal molecules which exhibit one of ferroelectric, antiferroelectric and ferrielectric phases.

The liquid crystal layer is formed of a liquid crystal material which exhibits an antiferroelectric phase while the liquid crystal material is in the bulk state. In the states wherein the liquid crystal material is sealed between the substrates and wherein no voltage is applied between the first and second electrodes, the liquid crystal material exhibits the antiferroelectric phase. When a voltage is applied between the first and second electrodes, the liquid crystal material exhibits the aforementioned mixed phase.

The director changing means includes means for applying, between the first and second electrodes, a voltage for changing the antiferroelectric phase to the mixed phase and controlling the alignment of the liquid crystal molecules exhibiting the mixed phase in order to change the director of the liquid crystal layer.

The surface effect which takes place at the interface between the liquid crystal layer and the alignment films induces the mixed phase.

In this case, alignment means and liquid crystal material are selected so that the aligning forces are substantially equal to or stronger than the interactions acting between the smectic layers.

When alignment means and liquid crystal material are selected so that the aligning forces are substantially equal to the interactions acting between the smectic layers, the liquid crystal layer while in the bulk state exhibits the antiferroelectric phase, and exhibits the ferrielectric phase under the condition wherein no voltage is applied to the first and second electrodes, and exhibits the mixed phase under the condition wherein a voltage is applied between the first and second electrodes. In the mixed phase, the director is controlled by an applied electric field.

When alignment means and liquid crystal material are selected so that the interactions between the smectic layers are weaker than the aligning forces, the liquid crystal layer while in the bulk state exhibits the antiferroelectric phase, and exhibits the mixed phase under the conditions wherein the liquid crystal layer is sealed between the first and second substrates and wherein no voltage is applied between the first and second electrodes. Under the condition wherein a voltage is applied between the first and second electrodes, the director in the mixed phase is controlled by the applied electric field.

In the liquid crystal display device having the above-described structure, the mixed phase may be one in which the liquid crystal layer contains liquid crystal molecules aligned parallel with the major surfaces of the first and second substrates, and liquid crystal molecules aligned being tilted at a predetermined angle with respect to the major surfaces of the first and second substrates.

In the mixed phase, the liquid crystal layer contains liquid crystal molecules exhibiting at least one of ferroelectric, antiferroelectric and ferrielectric phases, and liquid crystal molecules which move along cones traced by molecules exhibiting a chiral smectic phase and which are aligned tilted at a predetermined angle with respect to the major surfaces of the first and second substrates.

The liquid crystal layer while in the bulk state exhibits the antiferroelectric phase. In the states wherein the liquid crystal layer is sealed between the first and second substrates and wherein a voltage is applied between the first and second electrodes, the liquid crystal layer contains the liquid crystal molecules aligned tilted with respect to the major surfaces of the first and second substrates.

In the liquid crystal display device having the above-described structure, the liquid crystal layer may be formed of such a liquid crystal material that the liquid crystal layer, when sealed between the first and second substrates, exhibits the mixed phase over the entirety of the thickness of the liquid crystal layer.

Moreover, in the above-described liquid crystal display device, the liquid crystal layer may have a multi-layer structure wherein the liquid crystal molecules present in those parts of the liquid crystal layer which are located in the vicinity of the first and second substrates, exhibit the mixed phase, while the liquid crystal molecules which are separate from the vicinity of the first and second substrates exhibit another phase.

The above liquid crystal display device further comprises driving means for applying a voltage to the liquid crystal exhibiting the mixed phase, through active elements connected to the first electrodes or the second electrode, thereby moving liquid crystal molecules along cones traced by molecules exhibiting a chiral smectic phase, in order to control the director of the liquid crystal layer to perform gradation display.

According to the above-described structure, the liquid crystal molecules of the liquid crystal layer, to which the driving means has applied a voltage through the active elements, move along the cones traced by the molecules exhibiting the chiral smectic phase, in accordance with the polarity and magnitude of the applied voltage. The direction of the director of the liquid crystal layer varies continuously in accordance with the applied voltage. This permits the liquid crystal display device to display gradation.

It is preferred that in order to perform the gradation display without changing the mixed phase to a ferroelectric phase, the director of the liquid crystal layer in the mixed phase be moved by the driving means through an angle smaller than the maximum value of the cone angle which each of the cones, traced by molecules exhibiting a chiral smectic CA phase, forms with its own axis.

In the above-described structure, the gradation display is accomplished without setting the liquid crystal layer in a ferroelectric phase. Therefore, the display burning phenomenon is suppressed, and a high display screen contrast and a high image quality are attained.

According to the second aspect of the present invention, there is provided a method for driving a liquid crystal display device, comprising steps of:

sealing a liquid crystal layer between first and second substrates, the liquid crystal layer being formed of a liquid crystal which exhibits a chiral smectic phase while the liquid crystal is in a bulk state and which exhibits a mixed phase when the liquid crystal is sealed between the first and second substrates, the liquid crystal in the mixed phase containing liquid crystal molecules aligned in a plurality of alignment states which differ from each go other in an alignment order of liquid crystal molecules forming adjoining smectic layers; and applying a voltage to the liquid crystal layer, thereby moving liquid crystal molecules exhibiting the mixed phase along cones traced by molecules exhibiting a chiral smectic CA phase, in order to control a director of the liquid crystal layer in the mixed phase and perform gradation display.

In the above-described driving method, it is preferred that in order to perform the gradation display without changing the mixed phase to a ferroelectric phase, the director of the liquid crystal layer in the mixed phase be moved through an angle smaller than a maximum value of the cone angle which each of the cones, traced by molecules exhibiting the chiral smectic CA phase, forms with its own axis.

BRIEF DESCRIPTION OF THE DRAWINGS

The file of this patent contains at least one drawing (photograph) executed in color. Copies of this patent with color drawings will be provided by the Patent and Trademark Office upon request and payment of the necessary fee.

FIGS. 14A to 14C are timing charts for explaining the AFLC display device driving method of the present invention;

DETAILED DESCRIPTION OF THE PREFERRED EMBODIMENTS

LCD devices according to embodiments of the present invention, which devices are capable of displaying halftone images, will hereinafter be explained with reference to the accompanying drawings.

First Embodiment

An LCD device according to the first embodiment of the present invention will now be described.

Figure 1:
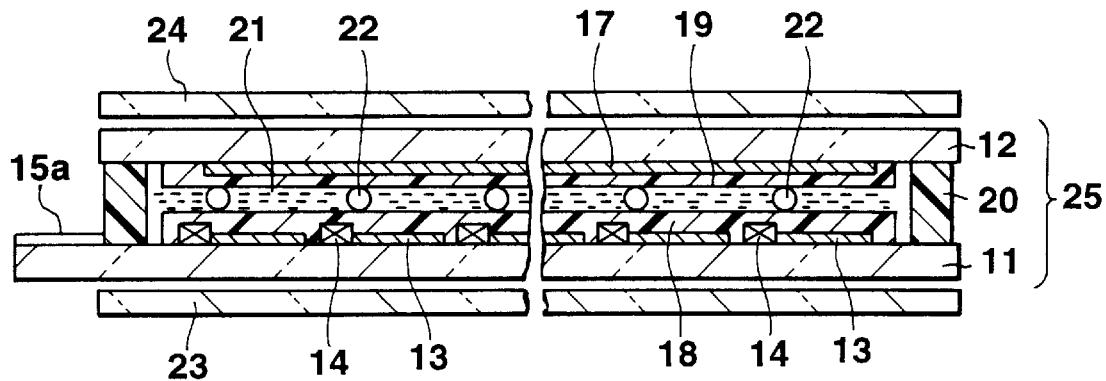
FIG. 1 is a diagram which illustrates a cross-sectional view showing the structure of a liquid crystal display device according to one embodiment of the present invention.

This LCD device is an active matrix type, and has a pair of transparent substrates (e.g., glass substrates) 11 and 12. In FIG. 1, transparent pixel electrodes 13 and active elements 14 connected thereto are arranged in a matrix pattern on the lower transparent substrate (hereinafter referred to as the lower substrate) 11.

The active elements 14 are formed of thin film transistors (hereinafter referred to as the TFTs 14), for example. Each of the TFTs 14 has a gate electrode formed on the lower substrate 11, a gate insulating film covering the gate electrode, a semiconductor layer formed on the gate insulating film, a source electrode formed on the semiconductor layer, and a drain electrode.

Figure 2:
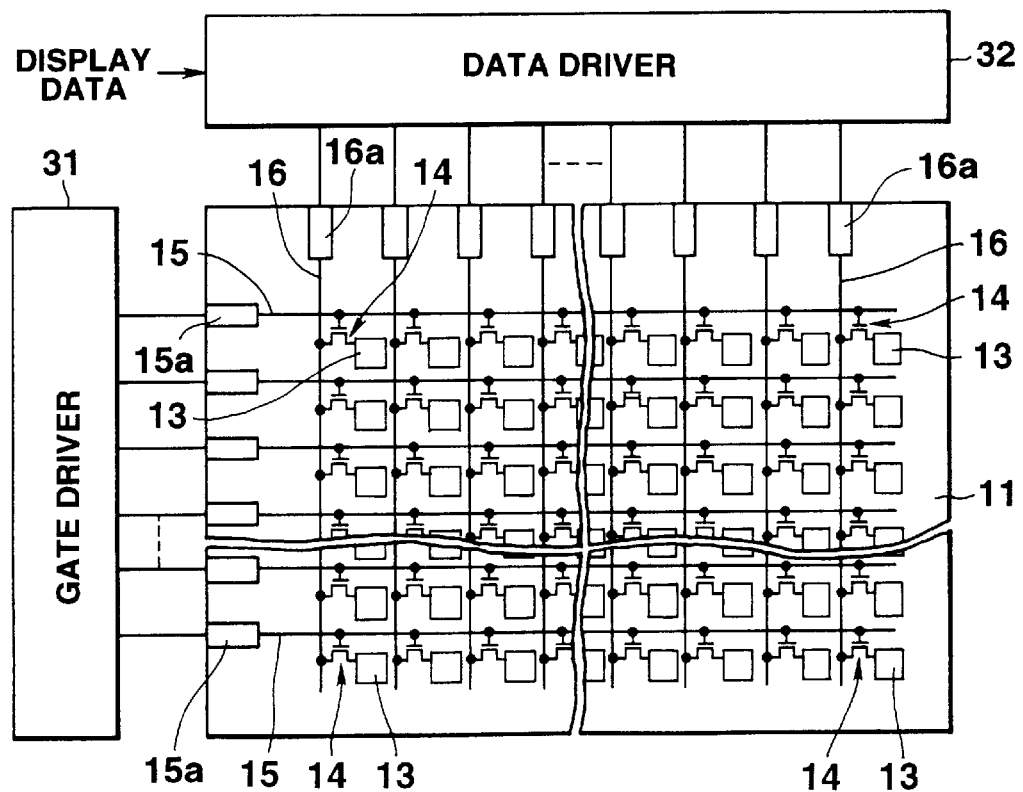
FIG. 2 is a diagram which illustrates a plan view showing the structure of the lower substrate of the liquid crystal display device illustrated in FIG. 1.

As illustrated in FIG. 2, gate lines (scanning lines) 15 are arranged between the rows of pixel electrodes 13, while data lines (gradation signal lines) 16 are arranged between the columns of pixel electrodes 13. The gate electrodes of the individual TFTs 14 are connected to their corresponding gate lines 15, and the drain electrodes of the TFTs 14 are connected to their corresponding data lines 16.

End portions 15a of the gate lines 15 are connected to a gate driver (gate driver circuit) 31. End portions 16a of the data lines 16 are connected to a data driver (data driver circuit) 32. The gate driver 31 applies a gate signal (which will be described later) to the gate lines 15 in order to scan the gate lines 15. The data driver 32 receives display data (gradation data) and applies a data signal corresponding to the display data to the data lines 16.

The gate lines 15 are covered with the gate insulating film (transparent film) of the TFTs 14, except their end portions 15a. The data lines 16 are formed on the gate insulating film. The pixel electrodes 13 are made of ITO or the like, and are formed on the gate insulating film. Each pixel electrode 13 is connected at its one end portion to the source electrode of a corresponding one of the TFTs 14.

In FIG. 1, a transparent common electrode 17, which faces the individual pixel electrodes 13 of the lower substrate 11, is formed on the upper transparent substrate (hereinafter referred to as the upper substrate) 12. The common electrode 17 is made of ITO or the like and is comprised of a single electrode extending over the entire display area. A reference voltage VO is applied to the common electrode 17. The pixel electrodes 13 and the common electrode 17 apply a voltage to an LC layer 21 sandwiched therebetween, thereby controlling the alignment direction of the LC molecules so that the direction of the director (the mean direction of the long axes) of the LC molecules varies continuously. By so doing, the optical axis of the LC layer is continuously controlled so as to control a display gradation.

Alignment films 18 and 19 are arranged one on each of those surfaces of the lower and upper substrates 11 and 12 on which the electrodes are formed.

The alignment films 18 and 19 are homogeneous alignment films which have undergone the alignment treatment of being rubbed in opposite directions so that the LC molecules are aligned in the same direction (the third direction 21C shown in FIG. 3 which will be discussed later), and have the aligning forces to align neighboring LC molecules substantially in the direction 21C of the alignment treatment.

It is preferred in the first embodiment that the surface energy of the alignment films 18 and 19 be small and that their alignment forces be relatively weak. The alignment films 18 and 19, which have been subjected to rubbing, are formed of an organic high molecular compound such as polyimide, for example, and are approximately 25 nm to 35 nm in thickness. Alignment films whose surface energy dispersion forces (esd) range from 38 to 41 dyn/cm and whose van der Waals forces (esp) are relatively weak and range from approximately 4 to 10 dyn/cm are desired as the alignment films 18 and 19.

The lower substrate 11 and the upper substrate 12 are adhered to each other at their peripheral edge portions via a frame-shaped seal member 20. An LC layer 21 is sealed in a region surrounded by the seal member 20 between the substrates 11 and 12. The thickness of the LC layer 21 is restricted by transparent spacers 22 which are arranged here and there in the region in which the LC layer 21 is sealed.

The LC layer 21 is formed of such an LC material that (1) in the bulk state, the LC material exhibits a chiral smectic CA (SmCA*) phase; (2) the LC material, when sealed between the substrates 11 and 12 and applied with no voltage, exhibits an antiferroelectric phase wherein a helix has been broken; (3) the LC material, when applied with a satisfactorily high voltage, exhibits a ferroelectric phase wherein the LC molecules are aligned substantially in the first direction 21A or second direction 21B shown in FIG. 3; and (4) the LC material, when applied with an intermediate electric field, exhibits a mixed phase wherein LC molecules in the antiferroelectric phase, those in the ferroelectric phase(s) and those in a phase different from the antiferroelectric and ferroelectric phases, are contained in the LC material.

The details of the LC layer 21 will be discussed later.

Figure 3:
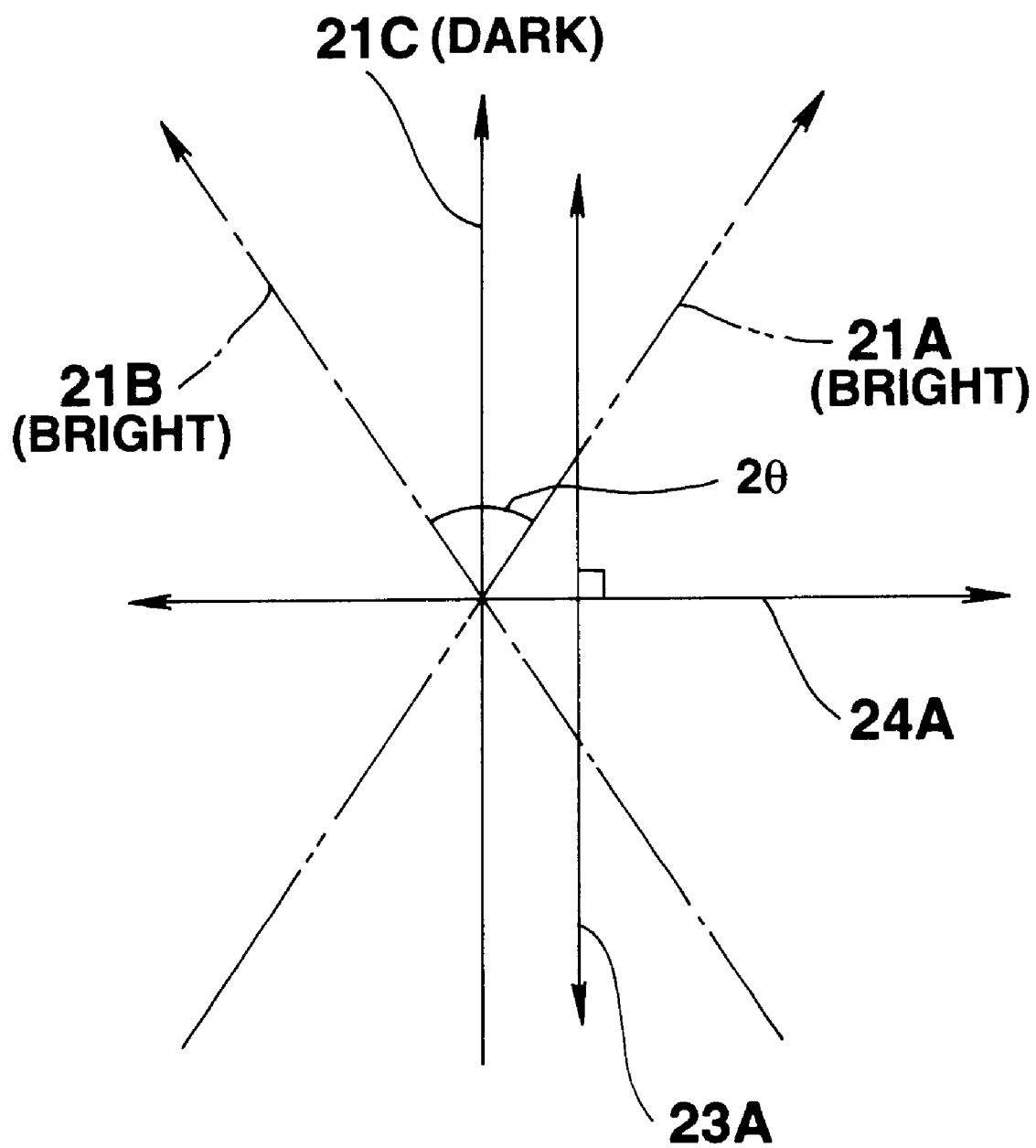
FIG. 3 is a diagram showing the relationship between the transmission axes of polarization plates and the alignment direction of liquid crystal molecules.

A pair of polarization plates 23 and 24 are arranged at the bottom and top of the LCD device. As shown in FIG. 3, the optical axis (hereinafter referred to as the transmission axis) 23A of the lower polarization plate 23 is set substantially parallel to a line normal to the smectic layers. The direction of the normal line is substantially coincident with the third direction 21C. The optical axis (hereinafter referred to as the transmission axis) 24A of the upper polarization plate 24 is set substantially perpendicular to the transmission axis 23A of the lower polarization plate 23.

In the AFLC display device whose polarization plates 23 and 24 have the transmission axes 23A and 24A set as shown in FIG. 3, when the molecules of the LC layer 21 are aligned in the ferroelectric order, the director of the LC layer 21 represents the first direction 21A or the second direction 21B, and the transmittance becomes almost maximum (the display becomes brightest). When the molecules of the LC layer 21 are aligned in the antiferroelectric phase, the director represents the third direction 21C, and the transmittance becomes almost minimum (the display becomes darkest).

More specifically, under the condition wherein the director of the LC layer 21 represents the first direction 21A or the second direction 21B, a change occurs in the polarization state of the linearly polarized light which has passed through the light incident-side polarization plate 23 in parallel with the transmission axis 23A, due to the birefringence effect of the LC layer 21. The light whose polarization state has thus changed enters the light outgoing-side polarization plate 24. A component of the light which is parallel to the transmission axis 24A passes through the light outgoing-side polarization plate 24, and the display becomes bright as a result.

Under the condition wherein the director represents the third direction 21C, the linearly polarized light which has passed through the light incident-side polarization plate 23 in parallel with the transmission axis 23A is hardly susceptible to the birefringence effect of the LC layer 21. The linearly polarized light which has passed through the light incident-side polarization plate 23 passes as is through the LC layer 21, and is mostly absorbed by the light outgoing-side polarization plate 24, with the result that the display becomes dark.

When the LC layer 21 is optically in an intermediate state, the gradation according to the direction of the director is attained.

The alignment films 18 and 19 and the LC layer 21 will now be described in more detail.

The LC layer 21 is formed of a liquid crystal whose main component is, for example, a liquid crystal composition having the skeleton expressed in Chemical Formula 1. This liquid crystal has the properties shown in Table 1.

[Chemical Formula 1]

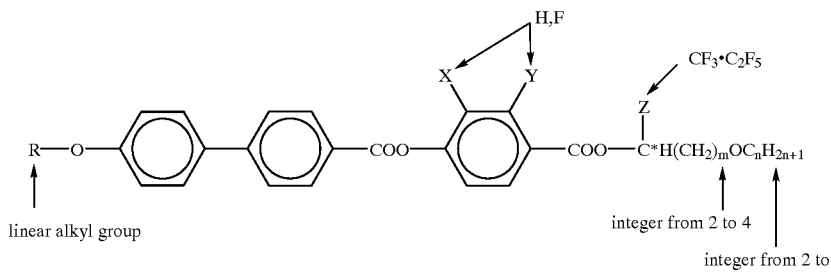

TABLE 1

| Phase transition sequence | Crystal - 30° C. - SmCA* - 69° C. - SmA - 80° C. - ISO |
|---|---|
| Spontaneous polarization | 229 nC/cm$^2$ |
| Cone angle θ | 32 degrees |
| Helical pitch | 1.5 microns |

The aforementioned cone angle is the angle which the axis of a cone traced by an LC molecule forms with the cone, and the first direction 21A and the second direction 21B form an angle of 2θ which is two times as large as the cone angle θ.

Features of the liquid crystal having the above structure and properties reside in that a gap in potential energy between the antiferroelectric and the ferroelectric phases is small, and that the antiferroelectric order is more liable to disorder and the pretransitional phenomena are more remarkable, compared to the case of a normal antiferroelectric liquid crystal. The "pretransitional phenomena" indicate such phenomena that when the electric field, which is applied to the molecules of the liquid crystal in the antiferroelectric phase, is intensified gradually, the transmittance of an LCD device employing the optical arrangement shown in FIG. 3 becomes high before a transition from the antiferroelectric phase to a ferroelectric phase occurs. An increase in the transmittance suggests that the LC molecules behave before the occurrence of the phase transition, and which in turn suggests that the gap in potential energy between the antiferroelectric and ferroelectric phases is small.

Figure 4:
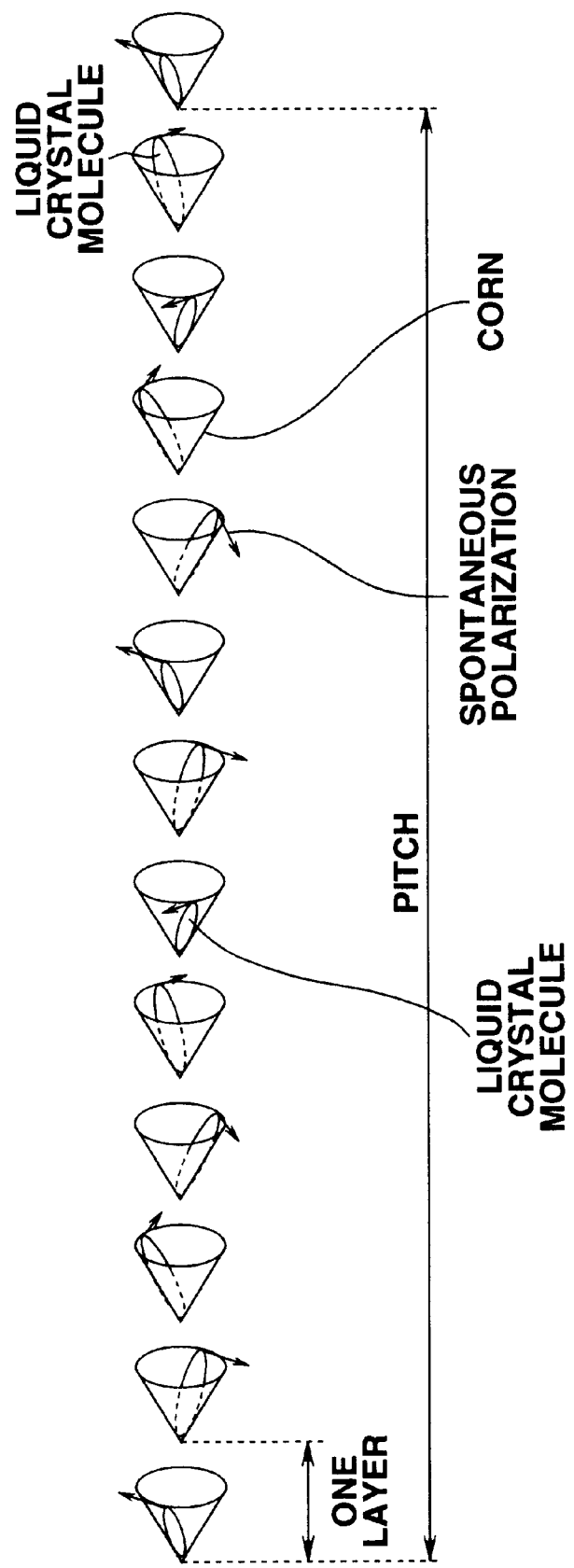
FIG. 4 is a diagram for explaining the double helical structure traced by molecules of a liquid crystal in a bulk state.

In the bulk state, the LC material of the LC layer 21 comprises layers which are formed of aligned molecules, and has a helical structure as shown in FIG. 4. Adjoining LC molecules in each layer have such a double helical structure that they trace helixes shifted approximately 180 degrees on imaginary cones. The spontaneous polarizations of the LC molecules in adjoining smectic layers cancel out each other.

Figure 5:
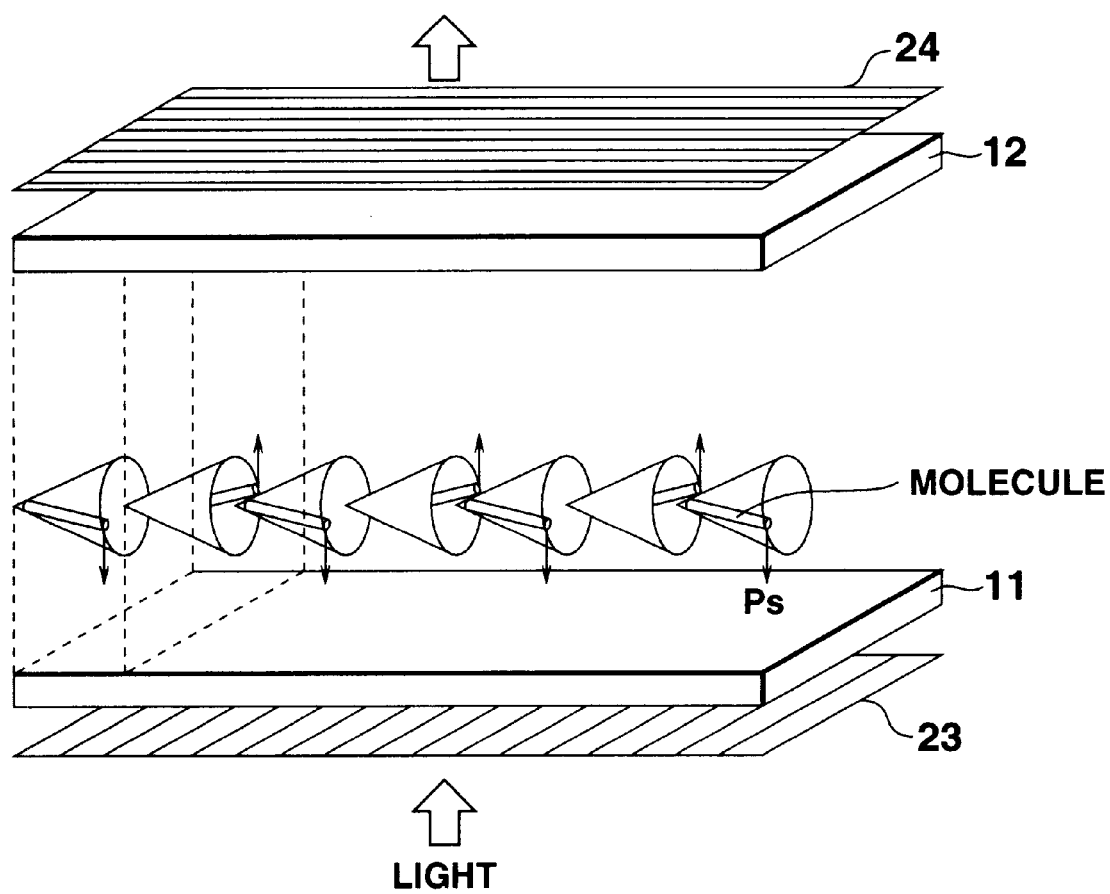
FIG. 5 is a diagram for explaining the state of the alignment of liquid crystal molecules sealed between substrates.

The thickness (cell gap) of the LC layer 21 is nearly equal to 1 pitch (natural pitch) of the helical structure of the LC material (the thickness of the LC layer 21 is 1.5 microns). The LC molecules are aligned by the aligning forces conferred on the alignment films 18 and 19 due to the alignment treatment. In this embodiment, however, the intermolecular forces acting between the LC molecules are stronger than the aligning forces. In consideration of this, the liquid crystal is sealed between the substrates 11 and 12 so as to exhibit the antiferroelectric phase wherein the double helical structure has been broken, as schematically illustrated in FIGS. 5 and 6(A).

The molecules of the liquid crystal sealed therebetween have the intermolecular forces to keep the molecules aligned in the antiferroelectric phase, while the aligning films 18 and 19 have the aligning forces to align neighboring LC molecules in the direction 21C of the alignment treatment.

When the aligning forces owing to the surface effect occurring at the interface between the liquid crystal and the alignment films are weaker than the intermolecular forces to keep the molecules aligned in the antiferroelectric phase, the liquid crystal remains in the antiferroelectric phase as in the case of the bulk state. When the aligning forces are considerably larger than the intermolecular forces, the liquid crystal exhibits the mixed phase which will be explained later. When the aligning forces are stronger than the intermolecular forces and are stronger also than such aligning forces as would cause the liquid crystal to exhibit the antiferroelectric phase and but are weaker than such aligning forces as would cause the liquid crystal to exhibit the mixed phase, the liquid crystal exhibits a ferrielectric phase.

In this embodiment, the intermolecular forces to keep the molecules of the LC layer 21 aligned in the antiferroelectric phase are stronger than the aligning forces of the alignment films, and smectic interlayer order is preserved. While no voltage is being applied to the LC layer 21, the LC layer 21 exhibits the antiferroelectric phase wherein the molecules in the individual smectic layers are aligned alternately in the first direction 21A and the second direction 21B; more strictly speaking, the LC molecules in one smectic layer of each adjoining pair of smectic layers are aligned in the first direction 21A shown in FIG. 3, while the LC molecules in the other smectic layer of each adjacent pair of smectic layers are aligned in the second direction 21B shown in FIG. 3. Under this condition, the director (the mean direction of the long axes of the LC molecules) represents the direction (the third direction 21C) of a line normal to the (smectic) layers having the layer structure of an SmCA* liquid crystal. As illustrated in FIG. 5, the spontaneous polarizations PS of the LC molecules in adjoining smectic layers are directed mutually in opposite directions, and cancel out each other. Moreover, the spatially mean optical axis of the liquid crystal layer 21 is substantially coincident with the direction (or the third direction 21C) of the normal line of the smectic layers.

When a satisfactorily high voltage having a positive polarity (which is equal to or greater than a saturation voltage) is applied to the LC layer 21, the LC molecules are aligned substantially in the first direction 21A, as shown in FIG. 6(B). Under this condition, the spontaneous polarizations of the LC molecules are directed substantially in the same direction, and the liquid crystal exhibits the first ferroelectric phase in which the optical axis of the LC layer 21 is substantially coincident with the first direction 21A. When a satisfactorily high voltage having a negative polarity (which is equal to or less than the saturation voltage) is applied to the LC layer 21, the LC molecules are aligned substantially in the second direction 21B, as shown in FIG. 6(C). Under this condition, the spontaneous polarizations of the LC molecules are directed substantially in the same direction, and the liquid crystal exhibits the second ferroelectric phase in which the optical axis of the LC layer 21 is substantially coincident with the second direction 21B.

Figure 7:
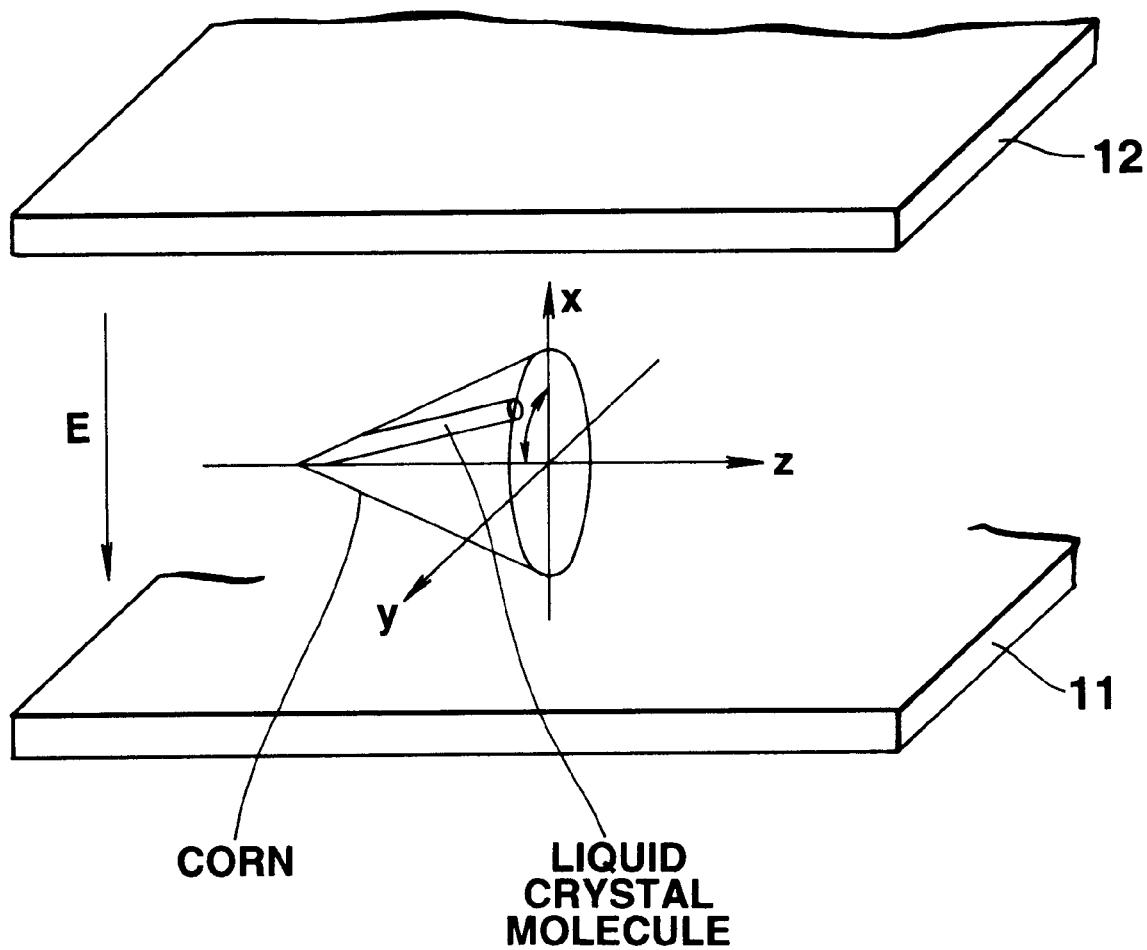
FIG. 7 is a diagram for explaining the behavior of the liquid crystal molecules when an intermediate voltage is applied to the liquid crystal.

As discussed previously, the molecular orientational order (the alignment order of the molecules) is weakened at the interface between the LC layer 21 and the alignment films 18 and 19, due to the alignment forces of the alignment films 18 and 19, and the LC molecules are able to easily move along imaginary cones. Meanwhile, the gap in potential energy between the antiferroelectric and ferroelectric phases of the LC layer 21 is small, and the antiferroelectric molecular orientational order is disordered relatively easily due to the surface effect occurring at the interface between the LC layer 21 and the alignment films 18 and 19. Hence, when an intermediate voltage is applied to the LC layer 21, some LC molecules behave (move) along the imaginary cones traced by the molecules exhibiting the chiral smectic CA* phase, and become tilted with respect to the major surfaces of the substrates 11 and 12, as shown in FIG. 7.

Figure 8:
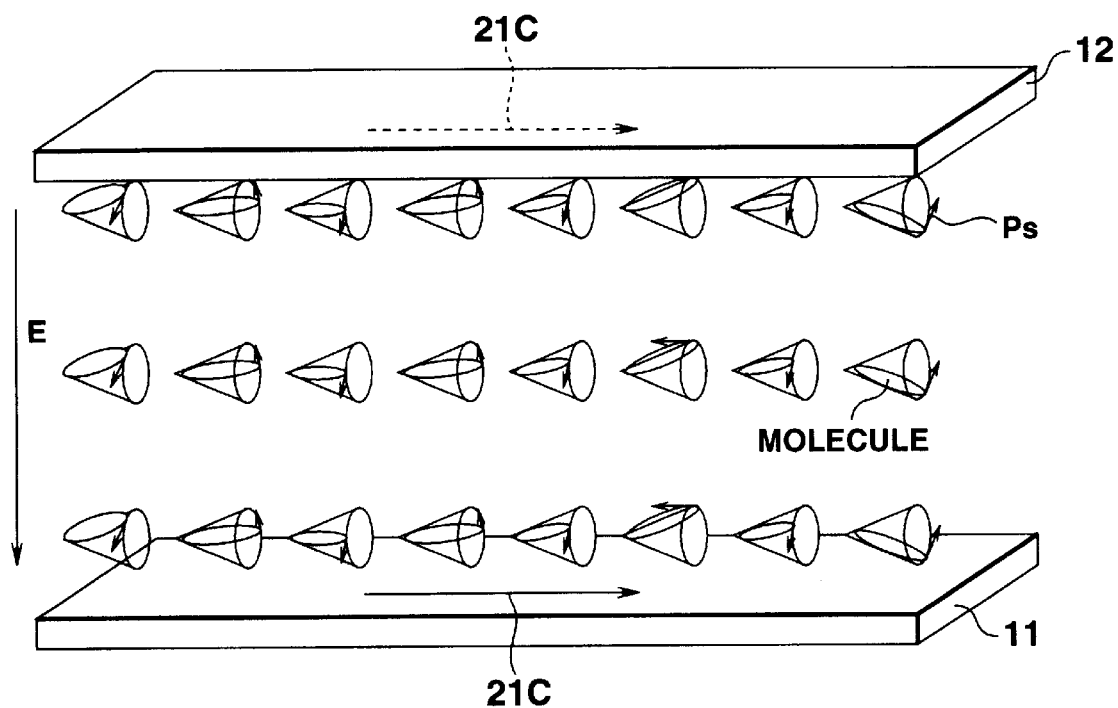
FIG. 8 is a diagram for explaining the state of the alignment of the liquid crystal molecules when the intermediate voltage is applied to the liquid crystal.

When a voltage lower than such a voltage as would cause the liquid crystal to exhibit a ferroelectric phase is applied to the LC layer 21, the LC layer 21 becomes the state wherein the LC layer 21 contains the LC molecules exhibiting the antiferroelectric phase (the molecules which maintain the antiferroelectric orientational order shown in FIG. 5) and the LC molecules tilted with respect to the substrate surfaces as shown in FIGS. 8 and 6(D) to 6(E).

As the applied voltage is intensified, the number of LC molecules exhibiting the antiferroelectric phase (the molecules which maintain the antiferroelectric orientational order shown in FIG. 6(A)) decreases, while the number of LC molecules tilted with respect to the substrate surfaces increases. Furthermore, some molecules are reversed in the direction of the alignment, and become the molecules exhibiting the ferroelectric phase(s) (the molecules which maintain the ferroelectric orientational order). As a result, the LC layer 21 becomes the state wherein the LC layer 21 contains the LC molecules exhibiting the antiferroelectric phase, those exhibiting the ferroelectric phase(s) and those exhibiting the intermediate phase and having a tilt.

In this state, the LC layer has fine domains formed of the LC molecules exhibiting the antiferroelectric phase, fine domains formed of the LC molecules exhibiting the ferroelectric phase(s) and fine domains formed of the LC molecules exhibiting the intermediate phase, and exhibits an optical characteristic corresponding to the average of the characteristics of those domains.

In this embodiment, the state of the LC layer 21 when the intermediate voltage is applied is referred to as the first mixed phase, because the LC layer 21 contains the LC molecules exhibiting the antiferroelectric, ferroelectric and intermediate phases.

The first mixed phase, in which the LC molecules aligned in the first direction 21A, those aligned in the second direction 21b and those tilted with respect to the substrate surfaces are mixed, is schematically depicted in FIG. 8. The ratio between the number of LC molecules exhibiting the antiferroelectric phase, that of LC molecules exhibiting the ferroelectric phase and that of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the liquid crystal vary continuously between the first and second directions 21A and 21B in accordance with the applied voltage, as shown in FIGS. 6(A) to 6(E).

When the optical characteristic of the LCD device having the above-described structure is shown in the form of a graph, it does not trace a horizontal line in the vicinity of an applied voltage of 0V, and smoothly varies continuously in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage is applied to the LC layer, the transmittance becomes saturated. Moreover, the hysteresis is considerably minor.

Figure 9A:
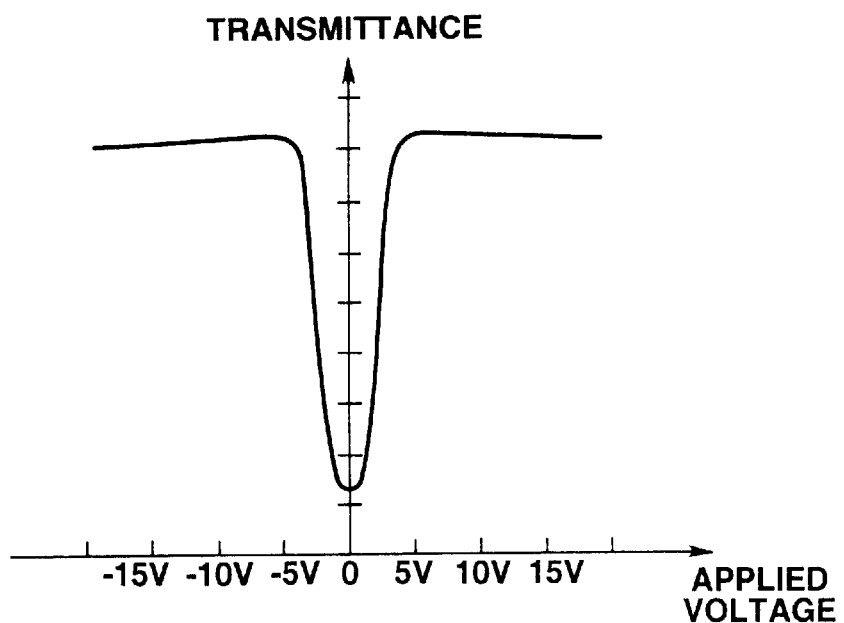
FIG. 9A is a graph showing the relationship between the applied voltage and the transmittance when a low frequency voltage having a rectangular waveform is applied to the liquid crystal display device of Example 1 (according to the present invention) which employs the optical arrangement illustrated in FIG. 3.

FIG. 9A shows an example of the relationship between the transmittance and the voltage applied to the LC layer of the LCD device (Example 1 according to the present invention). The LC layer 21 of this LCD device is formed of a liquid crystal whose main component is a liquid crystal composition which has been attained by processing the liquid crystal composition having the skeleton expressed in Chemical Formula 1 and having the properties shown in Table 1. The LC layer 21 is sealed with the cell gap being set at 1.5 microns and in the state wherein the helical structure traced by the LC molecules has been broken.

Figure 9B:
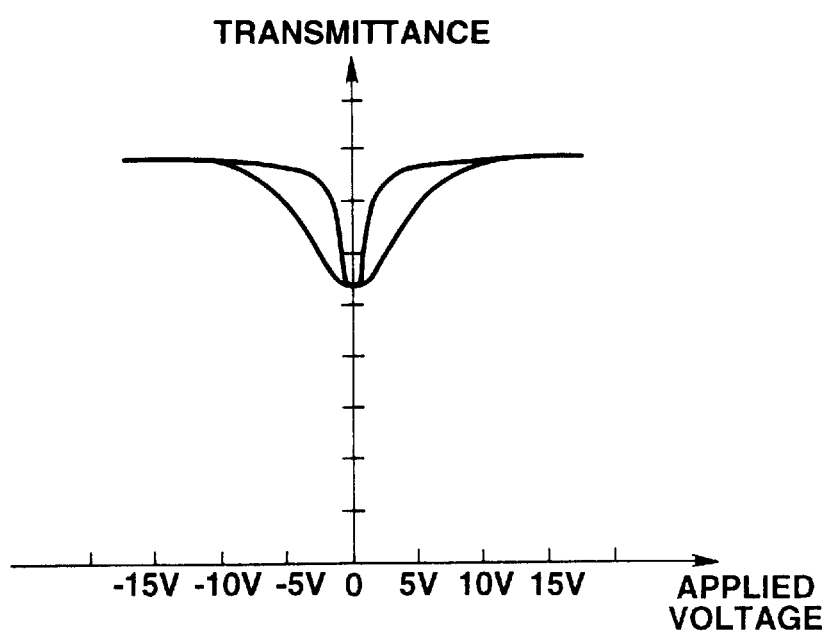
FIG. 9B is a graph showing the relationship between the applied voltage and the transmittance in Comparative Example 1 wherein a gap length is 5 microns.

FIG. 9B shows the relationship between the transmittance and the voltage applied to the LC layer included in the LCD device of Comparative Example 1. The LC layer of this LCD device is sealed with the cell gap being set at 5 microns and in the state wherein the helical structure traced by the LC molecules is maintained.

The characteristics shown in FIGS. 9A and 9B have been attained by applying rectangular-waveform voltages between the opposite electrodes 13 and 17.

As seen from FIG. 9A, the applied voltage versus transmittance characteristic of the LCD device of Example 1 according to the present invention does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast (a difference between the minimum transmittance and the maximum transmittance) is high. Applied voltages and transmittances are substantially in one-to-one correspondence with each other. This permits halftones to be reliably displayed, and enables high-contrast display images to be assuredly attained.

In contrast, in the case of Comparative Example 1, the interactions between the alignment films 18, 19 and the LC molecules in that part of the LC layer 21 which forms the middle of the LC layer 21 in its thickness direction are weak, and the mixed phase does not appear over the entire width of the LC layer 21. This results in that the applied voltage versus transmittance characteristic of the LCD device of Comparative Example 1 has a threshold value, the hysteresis is remarkable, and the applied voltage versus transmittance characteristic is not smooth. Moreover, the contrast is low.

In the LCD device of to Example 1 according to the present invention, the LC molecules behave as above in accordance with the applied voltage. This matter can be understood from, for example, the conoscope image shown in FIG. 10 and the enlarged views of the display screen which are shown in FIGS. 11A to 11C.

Figure 10:
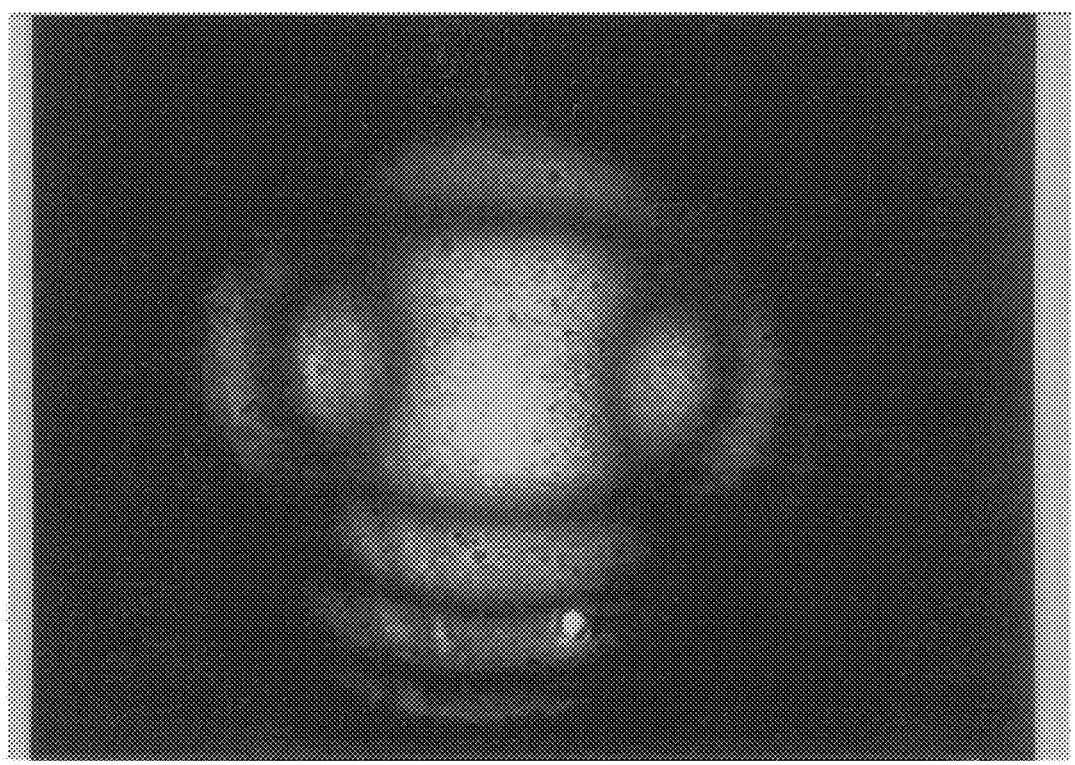
FIG. 10 is a photograph showing the conoscope image of the liquid crystal while in the bulk state.

FIG. 10 shows the conoscope image of the LC material while in the bulk state. In FIG. 10, two melanopes (bright spots) appear along an imaginary line which is nearly perpendicular to the arrow representing electric field E and which passes through the center of concentric isogyros (bright and dark rings), and are almost symmetric with respect to an imaginary line which is nearly parallel with the arrow of electric field E and which passes through the aforementioned center, which suggests that the LC molecules are in the antiferroelectric phase in which the LC molecules trace the double helical structure.

Figure 11A:
FIGS. 11A and 11C are microphotographs of the liquid crystal display device.
Figure 11B:
Figure 11C:
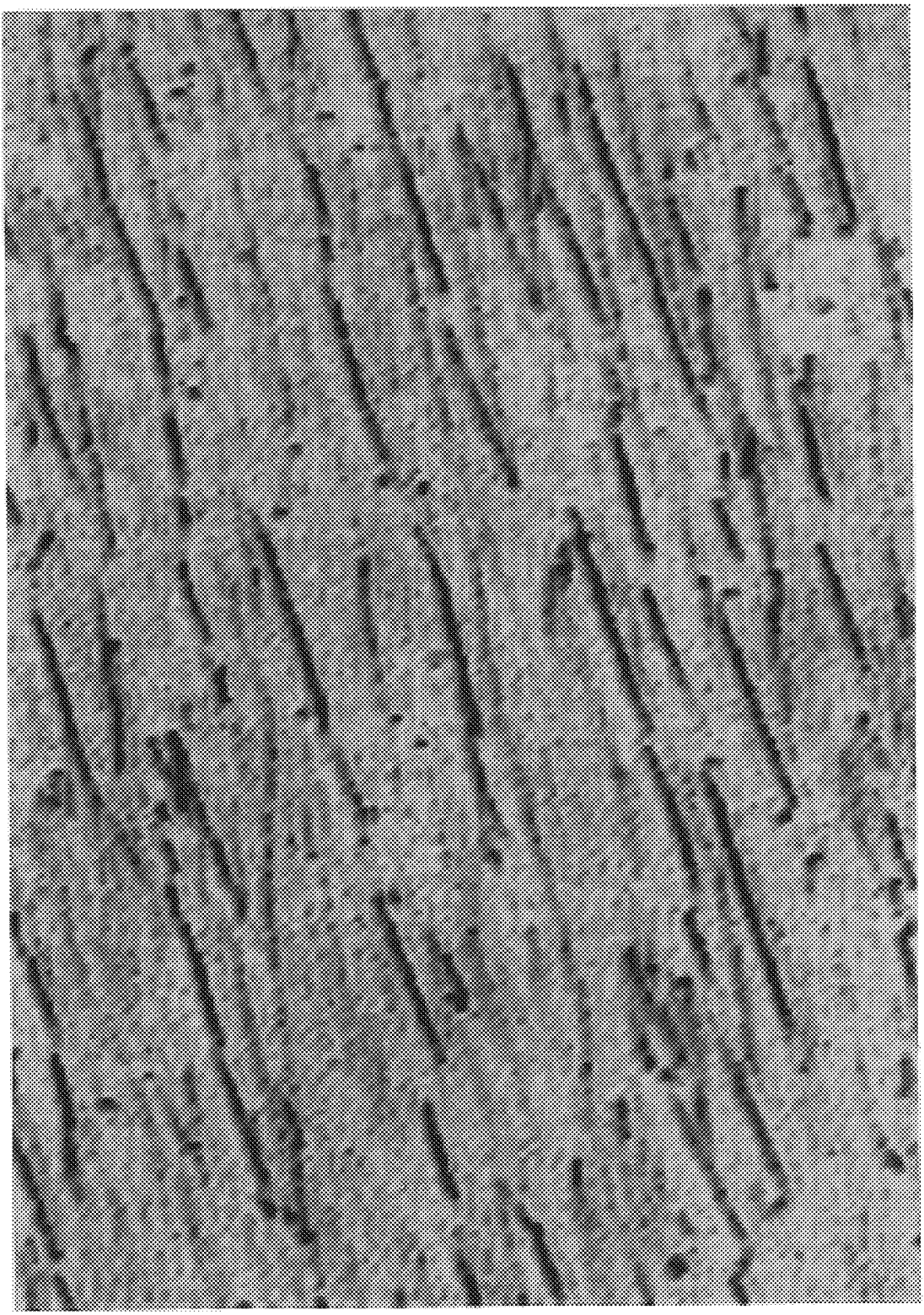

While no voltage is being applied to the LC layer 21 which is formed of the LC material sealed between the substrates, almost the entire display screen is dark, as seen from FIG. 11A. When a high voltage is applied to the LC layer 21, almost the entire display screen becomes bright, as seen from FIG. 11C, which indicates that the LC molecules are aligned in the first or second direction. When an intermediate voltage is applied to the LC layer 21, the entire display screen displays dark or bright portions in accordance with the applied voltage, as seen from FIG. 11B. While the intermediate voltage is being applied to the LC layer 21, the LC layer exhibits the mixed phase.

Thus, the LC molecules of the LC layer 21 of this embodiment behave along the cones in accordance with the applied voltage, and the state of the alignment of the LC molecules changes from the first/second alignment state to the second/first alignment state as a result. Under this condition, the mean alignment direction (director) of the LC layer 21 varies continuously in accordance with the applied voltage such that the transmittance varies continuously. This permits an image to be displayed at the desired gradation.

In FIG. 3, the transmission axis 23A of the lower polarization plate 23 is arranged nearly parallel with the normal line of the smectic layers included in the LC layer 23, while the transmission axis 24A of the upper polarization plate 24 is arranged perpendicular to the transmission axis 23A. However, the arrangements of the transmission axes 23A and 24A of the lower and upper polarization plates 23 and 24, for example, can be arbitrarily determined depending on the electro-optical characteristic of the required LCD device.

Figure 12A:
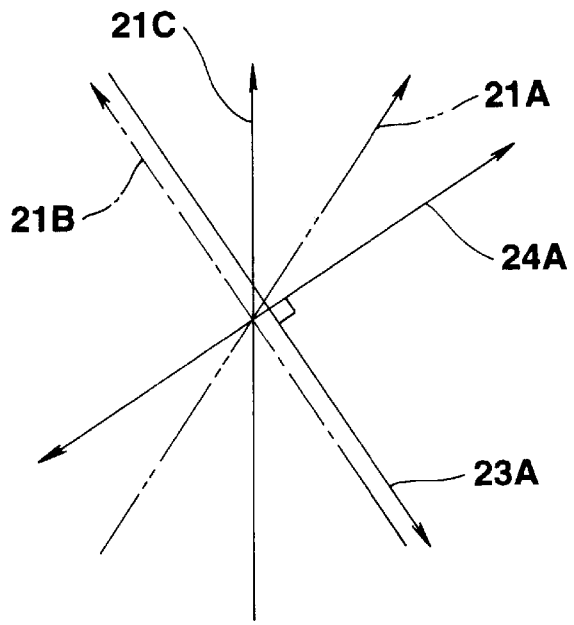
FIGS. 12A and 12B are diagrams showing other examples of the relationship between the transmission axes of the polarization plates and the alignment direction of the liquid crystal molecules.

For example, the transmission axis 23A of the lower polarization plate 23 can be arranged parallel with the second direction 21B, and the transmission axis 24A of the upper polarization plate 24 can be arranged perpendicular to the transmission axis 23A of the lower polarization plate 23, as illustrated in FIG. 12A. According to this structure, when a satisfactorily high negative voltage (which is equal to or greater than the threshold value) is applied to the LC layer 23, the director represents the second direction 21B such that the display becomes darkest. When a satisfactorily high positive voltage (which is equal to or greater than the threshold value) is applied to the LC layer 23, the director represents the first direction 21A such that the display becomes brightest.

In the case of employing an LC material whose cone angle θ is larger than 22.5 degrees, the transmission axis of one polarization plate (the lower polarization plate 23 or the upper polarization plate 24) may be arranged so as to form an angle of 22.5 degrees with the normal line of the smectic layers of the LC layer 21. The second direction 21B, which serves as the director when the LC layer 21 exhibits a ferroelectric phase, may be determined so that an angle larger than 22.5 degrees but is smaller than the cone angle θ is formed between the second direction 21B and the normal line of the smectic layers of the LC layer 21. The transmission axis of the other polarization plate may be arranged substantially perpendicular to the transmission axis of the aforementioned one polarization plate. Employing this optical arrangement, the LC can be driven without setting the LC in a ferroelectric phase, with the result that the display burning phenomenon, etc. can be prevented from occurring, and the flicker can be suppressed.

Figure 12B:
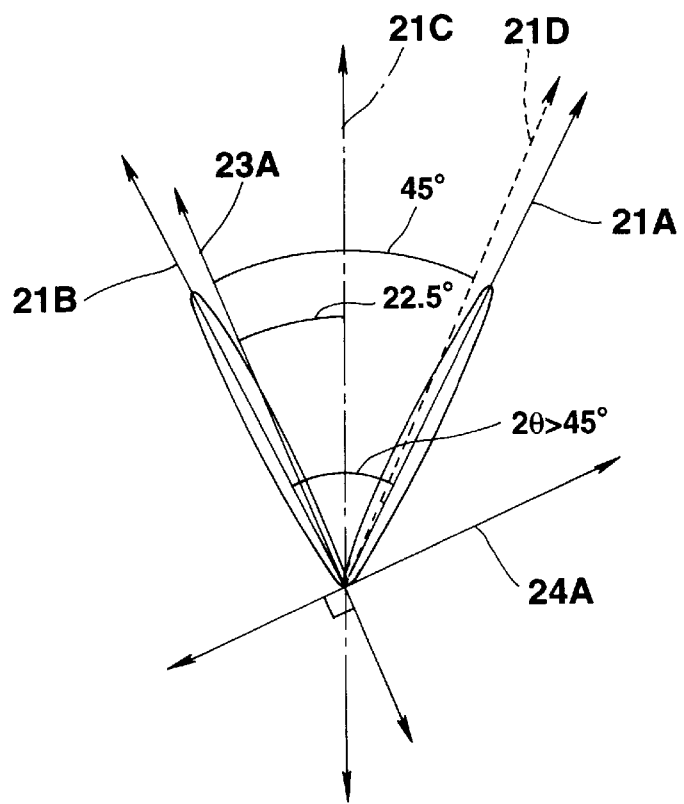

For example, in the case of adopting an LC material whose cone angle is 32 degrees as shown in Chemical Formula 1, the transmission axis 23A of the lower polarization plate 23 is arranged so as to intersect the normal line of the smectic layers of the LC layer 21 at an angle of 22.5 degrees, for example (the direction of the normal line is substantially coincident with the direction 21C), as illustrated in FIG. 12B. The transmission axis 24A of the upper polarization plate 24 is arranged substantially perpendicular to the transmission axis 23A.

The amount of transmission light is controlled by applying between the opposite electrodes a voltage lower than such a voltage as would cause the LC layer, formed of the above-described liquid crystal, to exhibit a ferroelectric phase, so that the direction of the director of the LC layer varies in a range defined between a direction (23A), which forms an angle of 22.5 degrees with the normal line of the smectic layers (the direction of the normal line is substantially coincident with the direction 21C), and a direction (21D) which forms an angle of 22.5 degrees with the normal line of the smectic layers.

According to the above structure, the display becomes darkest when the director is coincident with the direction of the transmission axis 23A, and the display becomes brightest when the director is coincident with the direction 21D which forms an angle of 45 degrees with the transmission axis 23A. In this case, the gradation display can be achieved without varying the direction of the director until it becomes coincident with the first direction 21A and the second direction 21B in order to attain the minimum to maximum gradations. In other words, the LC can be driven without setting the LC in a ferroeletric phase.

Even in the case where the above-described optical arrangement is employed, the relationship between the applied voltage and the behavior, phase transition, etc. of the molecules within the LC layer 21 is as discussed previously, and the direction of the director varies continuously between the first direction 21A and the second direction 21B so that an image can be displayed at the desired gradation. Furthermore, flicker is reduced as compared to the case of the optical arrangement illustrated in FIG. 3, and the liquid crystal layer 21 is not set in a ferroelectric phase. Therefore, the display burning phenomenon is suppressed, and high-contrast contrast display images of an excellent quality are attained.

Figure 13A:
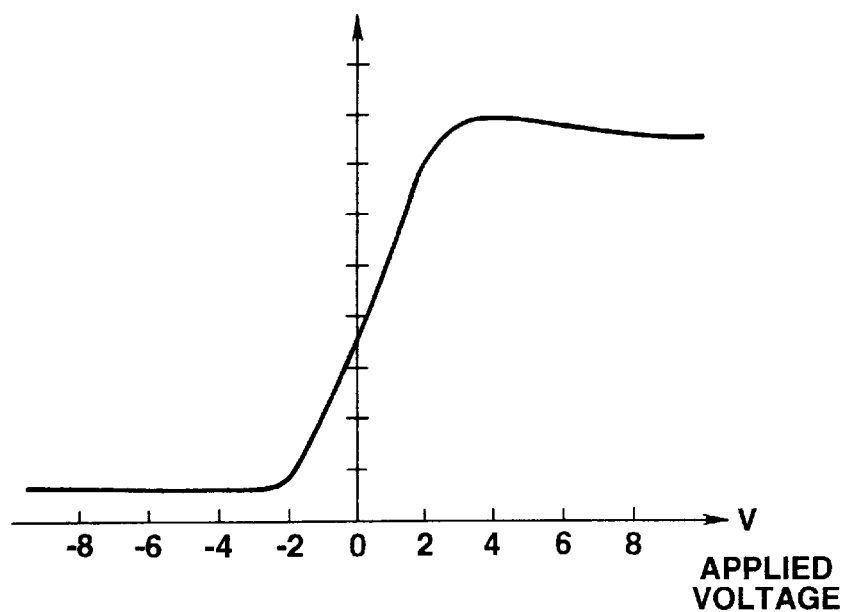
FIG. 13A is a graph showing the relationship between the applied voltage and the transmittance when a low frequency voltage having a rectangular waveform is applied to the liquid crystal display device of Example 2 (according to the present invention) which employs the optical arrangement illustrated in FIG. 12B.

FIG. 13A shows the applied voltage versus transmittance characteristic of the LCD device (Example 2 according to the present invention). In this LCD device, the optical arrangement illustrated in FIG. 12B is applied to the above-described LC cell (in which a liquid crystal, having the properties shown in Table 1 and containing as the main component a liquid crystal composition having the skeleton expressed in Chemical Formula 1, is sealed with the cell gap being set at 1.5 microns).

Figure 13B:
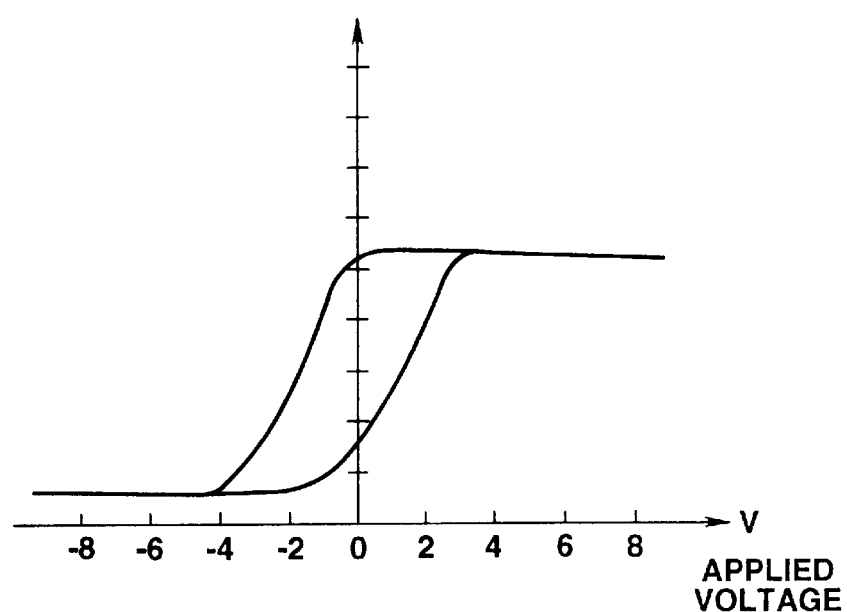
FIG. 13B is a graph showing the relationship between the applied voltage and the transmittance in Comparative Example 2 wherein the gap length is 5 microns.

FIG. 13B shows the applied voltage versus transmittance characteristic of an LCD device (of Comparative Example 2) which is identical in structure with that of Example 2 of the present invention, except that the cell gap is 5 microns.

The characteristics shown in FIGS. 13A and 13B have been obtained by applying rectangular-waveform voltages between the opposite electrodes 13 and 17.

As seen from FIG. 13A, the applied voltage versus transmittance characteristic of the LCD device of Example 2 according to the present invention does not have a definite threshold value, and the transmittance varies continuously. The curve representing the characteristic when positive voltages are applied to the LC layer and the curve representing the characteristic when negative voltages are applied to the LC layer are symmetrical, the hysteresis is minor, and the contrast is high. On the other hand, in the case of Comparative Example 2, the applied voltage versus transmittance characteristic has a threshold value, the hysteresis is considerable, and the applied voltage versus transmittance characteristic is not smooth, as seen from FIG. 13B. Moreover, the contrast is low.

It can be ascertained from FIGS. 13A and 13B that also the LCD device of Example 2 according to the present invention has an excellent display ability.

A method for driving the LCD devices of the present invention which are structured as explained above will now be described with reference to FIGS. 14A to 14C.

FIG. 14A shows a gate signal which the gate driver 31 applies to a gate line 15 in an arbitrary row, while FIG. 14B shows a data signal which the data driver 32 supplies to each data line 16 in synchronization with a gate pulse. The voltage of the data signal is set at such a value as would not cause the LC layer 21 to exhibit a ferroelectric phase, i.e., at a voltage between VTmax and VTmin and corresponding to the transmittance to be attained. FIG. 14C shows variations in the transmittance which occur upon the application of data pulses shown in FIG. 14B.

Each gate signal becomes ON as a gate pulse in the selection period during which a corresponding row is selected. This gate pulse turns on the TFTs in the selected row. In the writing period during which the TFTs 14 are ON, the data signal corresponding to a display gradation is applied between the pixel electrodes 13 and the common electrode 17 facing the pixel electrodes 13. When the gate pulse becomes OFF, the TFTs 14 become OFF, and the voltage applied between the electrodes 13 and 17 until then is retained in pixel capacitors each being comprised of one electrode 13, the electrode 17 and the LC layer 21 sandwiched therebetween. As shown in FIG. 14C, the display gradation corresponding to the retained voltage is maintained until the selection period in which the next row is selected. Thus, according to this driving method, an image can be displayed at the desired gradation by controlling the voltage of a data pulse.

Figure 15:
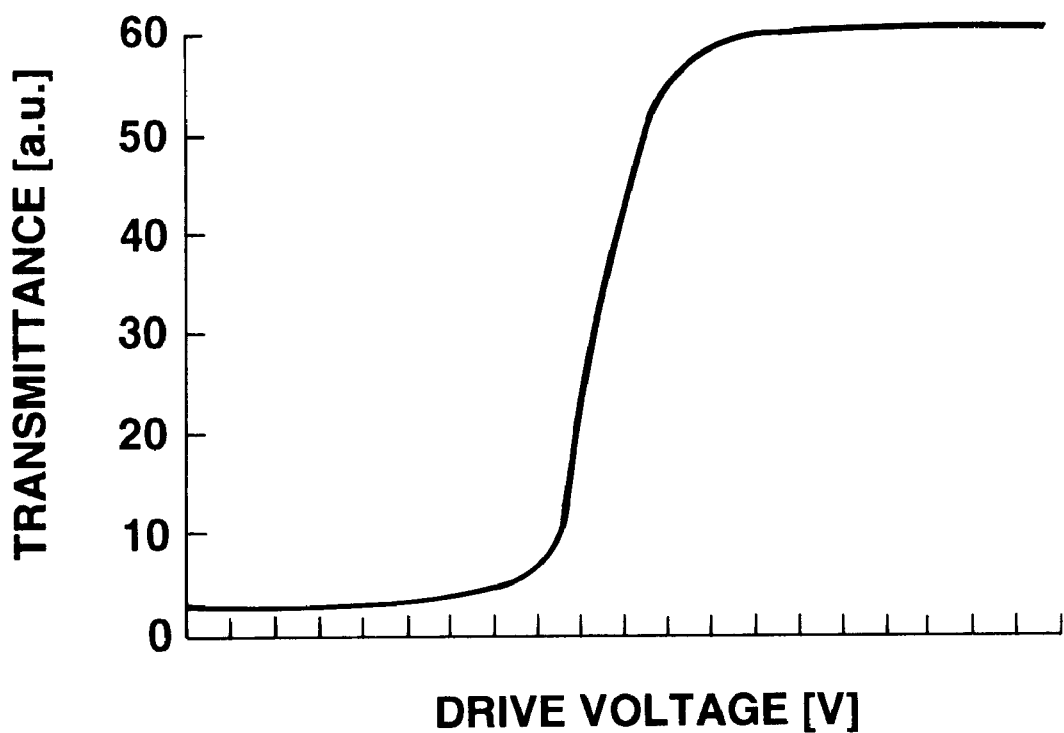
FIG. 15 is a diagram showing the relationship between the applied voltage and the transmittance when the liquid crystal display device of Example 2 according to the present invention is driven using the driving method shown in FIGS. 14A to 14C.

FIG. 15 shows variations in the transmittance when the LCD device of Example 2 according to the present invention is driven by the driving method shown in FIGS. 14A and 14B, and when the voltage of the data signal is increased sequentially from −5V to +5V and is lowered sequentially from +5V to −5V. It can be understood from FIG. 15 that an image can be reliably displayed at the desired gradation by employing the driving method shown in FIGS. 14A and 14B.

An example of the structure of the data driver 32, which makes such a drive possible, will now be described with reference to FIG. 16.

Figure 16:
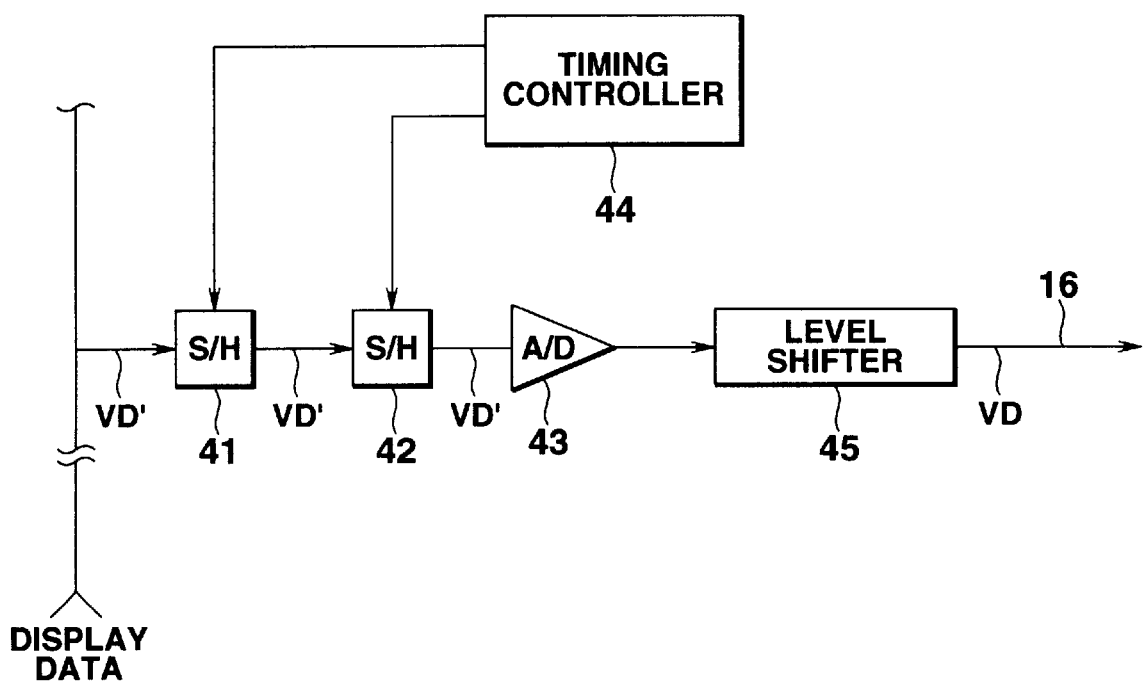
FIG. 16 is a block diagram exemplifying the structure of a driver circuit for accomplishing the driving method shown in FIG. 14A to 14C.

As illustrated in FIG. 16, the data driver 32 includes a first sampling/holding circuit 41, a second sampling/holding circuit 42, an A/D (Analog/Digital) converter 43, a timing controller 44 and a level shifter 45.

The first sampling/holding circuit 41 samples/holds a signal component (one image data item) VD', for a corresponding pixel, of an externally supplied analog display signal. The second sampling/holding circuit 42 samples/holds the signal VD' held by the first sampling/holding circuit 41.

The A/D converter 43 converts the signal held by the second sampling/holding circuit 42 to digital gradation data.

In each selection period TS, the timing controller 44 supplies timing control signals as sampling/holding instructions to the first and second sampling/holding circuits 41 and 42.

The level shifter 45 converts the digital gradation data, output from the A/D converter 43, to a data pulse having a corresponding voltage VD (a voltage for a driving system and which is required to display the gradation designated by the digital gradation data), and outputs the data pulse to a corresponding one of the data lines 16. The level shifter 45 separates a power supply unit for a signal processing system and that for the driving system from each other. The voltage VD output from the level shifter 45 is applied to the LC layer 21 in the writing period during which the TFTs 14 in a corresponding row are ON, and is retained between the electrodes 13 and 17 while the TFTs 14 are OFF.

The first sampling/holding circuit 41, the second sampling/holding circuit 42, the AND converter 43 and the level shifter 45 are arranged per column of pixels, while the timing controller 44 is arranged in common to a plurality of column of pixels.

The structure of the data driver 32 is not limited to that illustrated in FIG. 16. For example, a sampling/holding circuit included in the A/D converter 43 may be used as the second sampling/holding circuit 42. The data output from the A/D converter 43 may be processed in a specific way, after which the processed data may be supplied to the level shifter 45 so as to be converted to the voltage for the driving system. The processed data may be converted to a gradation signal having a voltage for the signal processing system, and thereafter may be supplied to the level shifter 45 so as to be converted to the voltage for the driving system.

A variety of timing signals can be supplied from the outside of the data driver 32. Further, image data itself may be digital data.

The present invention is not limited to the first embodiment, and various modifications and applications are available.

For example, the liquid crystal of the present invention is not limited to one whose main component is a liquid crystal composition having the skeleton shown in Chemical Formula 1, and any other liquid crystal can be employed insofar it exhibits the mixed phase. The properties of the liquid crystal are also not limited to those described previously. The material, thickness, etc. of the alignment films can also be changed when needed.

Any combination of the LC material and the alignment films can be employed as far as the aligning forces are weaker than the intermolecular forces acting between the LC molecules forming the above-described LC layer, and as far as the LC layer is able to exhibit the mixed phase.

The thickness of the LC layer 21 can also be arbitrarily determined as far as the LC layer is able to exhibit the mixed phase over the entire thickness. Even a liquid crystal layer, a part of which is not able to exhibit the mixed phase, can also be employed insofar as the presence of such a part hardly influences display.

Moreover, according to the first embodiment, the polarization plates 23 and 24 are arranged so that their transmission axes 23A and 24A are perpendicular to each other. However, the polarization plates 23 and 24 can be arranged so that their transmission axes are parallel with each other. Further, the optical axes of the polarization plates may be absorption axes.

Furthermore, the present invention is not limited to an AFLC display device which adopts TFTs as active elements, and is applicable also to an AFLC display device which adopts MIMs as active elements.

Figure 17:
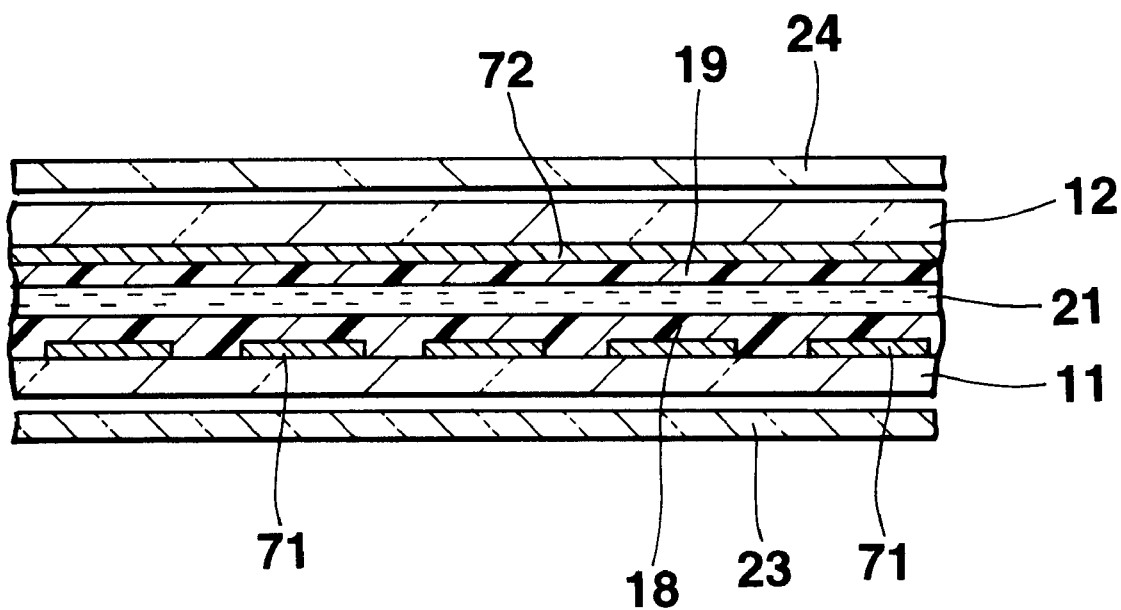
FIG. 17 is a diagram showing the structure of a simple matrix type liquid crystal display device.

The present invention is applicable also to a simple matrix (passive matrix) type display device in which scanning electrodes 71 and signal electrodes 72 perpendicular to the scanning electrodes 71 are arranged on the opposite surfaces of the substrates 11 and 12 facing each other, as illustrated in FIG. 17.

Second Embodiment

The LCD device of to the second embodiment of the present invention will now be described.

The basic structure of the LCD device of the second embodiment is substantially the same as that of the LCD device of the first embodiment shown in FIGS. 1 to 4.

The LCD layer 21 of the second embodiment is formed of a liquid crystal whose main component is a liquid crystal composition having the skeleton shown in Chemical Formula 1, for example, and has the properties shown in Table 1. In the bulk state, the liquid crystal exhibits the chiral smectic CA (SmCA*) phase. The surface energy dispersion forces (esd) of the alignment films 18 and 19 range from approximately 38 to 41 dyn/cm, while the van der Waals forces (esp) range from approximately 4 to 10 dyn/cm. Those matters are basically the same as those of the LCD device of the first embodiment.

However, the aligning forces of the alignment films 18 and 19 of the second embodiment are stronger than those of the alignment films of the first embodiment. The intermolecular forces acting between the molecules of the liquid crystal employed in the second embodiment are approximately equal to the aligning forces of the alignment films of the second embodiment. The LC molecules are subjected to the aligning forces conferred on the alignment films 18 and 19 through the alignment treatment. Those alignment forces are stronger than the aligning forces to which the LC molecules are subjected in the first embodiment. Under the above-described conditions, (1) the LC layer 21 of the second embodiment, when sealed between the substrates 11 and 12 and applied with no voltage, exhibits a ferrielectric phase; (2) the LC layer 21, when sealed between the substrates 11 and 12 and applied with a satisfactorily high voltage, exhibits a ferroelectric phase wherein the LC molecules are aligned substantially in the first direction 21A or second direction 21B shown in FIG. 3, in accordance with the polarity of the applied voltage; and (3) the LC layer 21, when applied with an intermediate electric field, exhibits a mixed phase wherein LC molecules, aligned exhibiting an intermediate phase which is different in the state of the molecular alignment from the ferrielectric and ferroelectric phases, are present in the LC layer 21.

Figure 18:
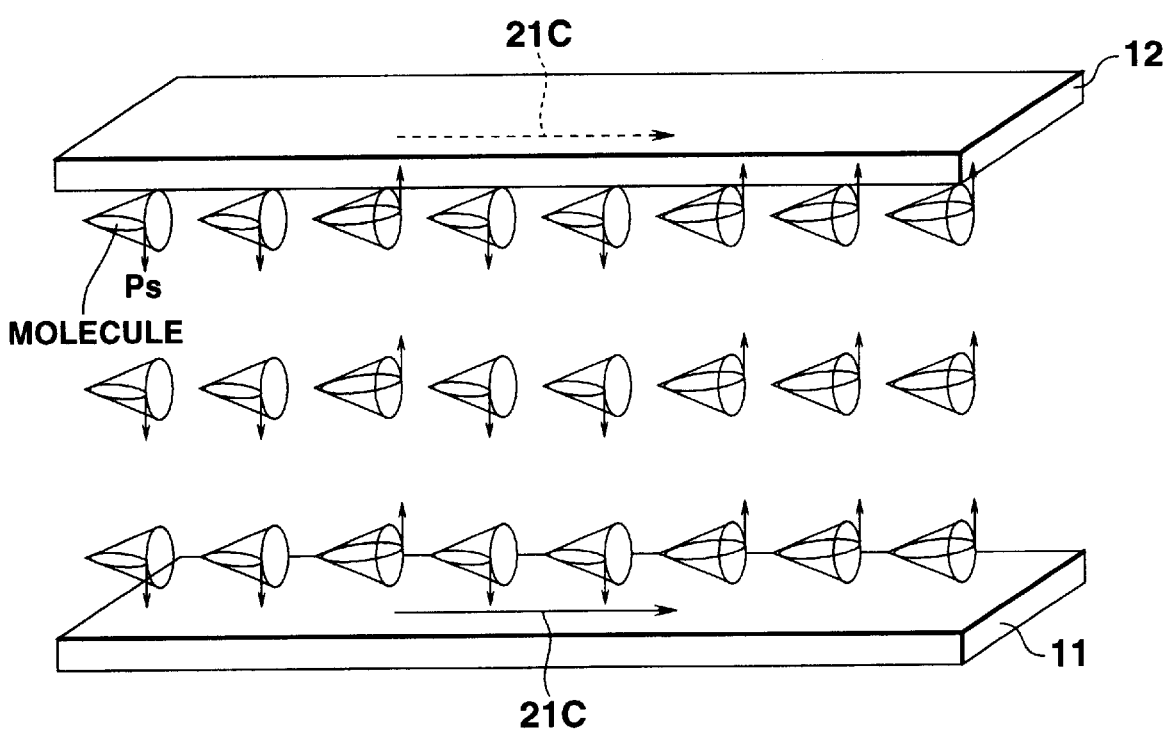
FIG. 18 is a diagram for explaining the state of the alignment of the liquid crystal molecules sealed between the substrates and exhibiting a ferrielectric phase.
Figure 19:
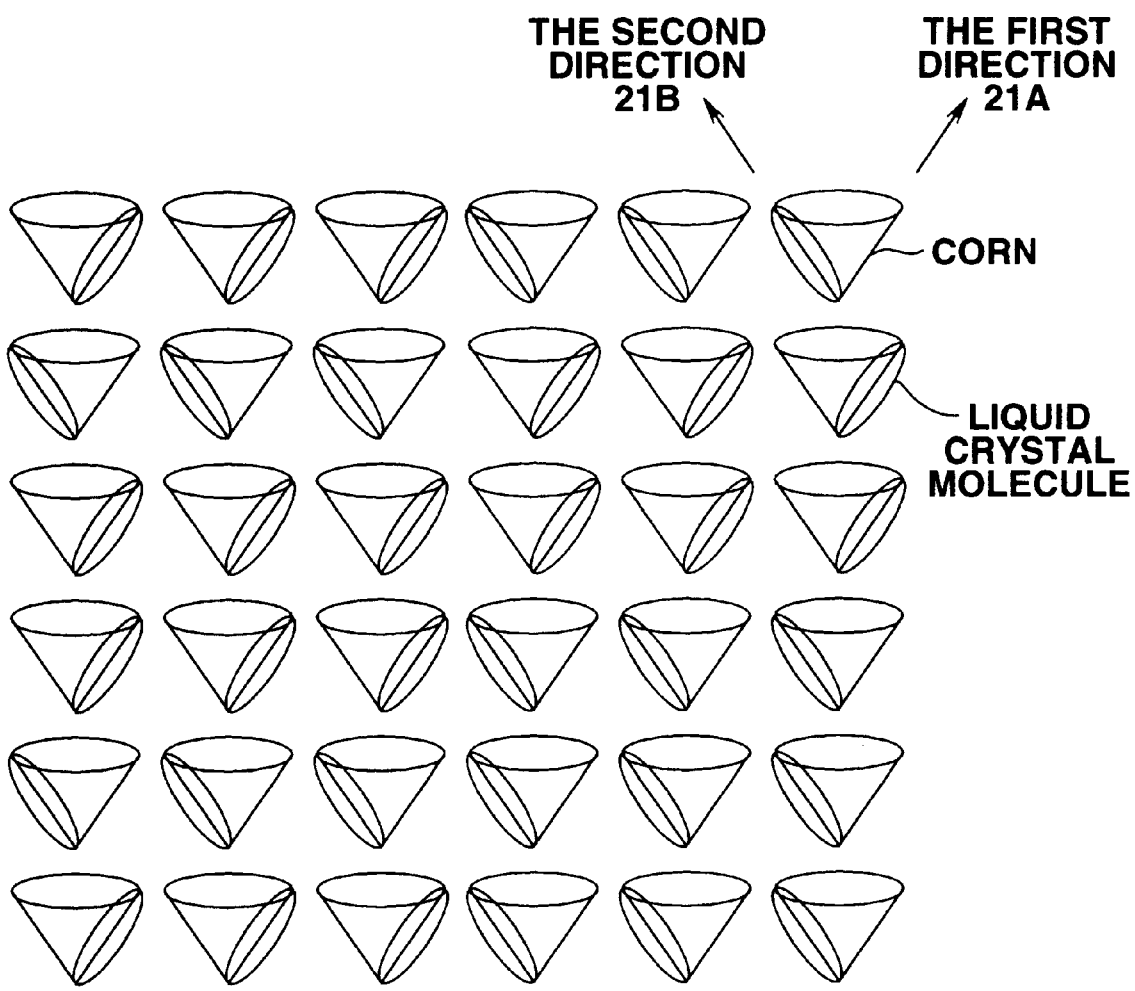
FIG. 19 is a diagram for explaining the state wherein the alignment of the liquid crystal molecules sealed between the substrates and exhibiting the ferrielectric phase is projected on a substrate surface.

In the ferrielectric phase, as shown in FIG. 18 as a perspective view and as shown in FIG. 19 as a view projected on a substrate surface, the LC molecules in each smectic layer are aligned with their long axes being set in the first direction 21A or the second direction 21B. The smectic layers are arranged in predetermined order. The number of LC molecules aligned with their long axes being set in the first direction 21A and the number of LC molecules aligned with their long axes being set in the second direction 21B are equal to each other.

Since the number of LC molecules aligned in the first direction (the first alignment state) and that of LC molecules aligned in the second direction (the second alignment state) are equal with each other, the director (the mean direction of the long axes of the LC molecules) is substantially coincident with the direction (the third direction 21C) of the normal line of the (smectic) layers of the layer structure of an SmCA* liquid crystal. The spontaneous polarizations PS of the LC molecules cancel out each other. Furthermore, the spatially mean optical axis of the LC layer 21 is substantially coincident with the direction (the third direction 21C) of the normal line of the smectic layers.

Figure 20:
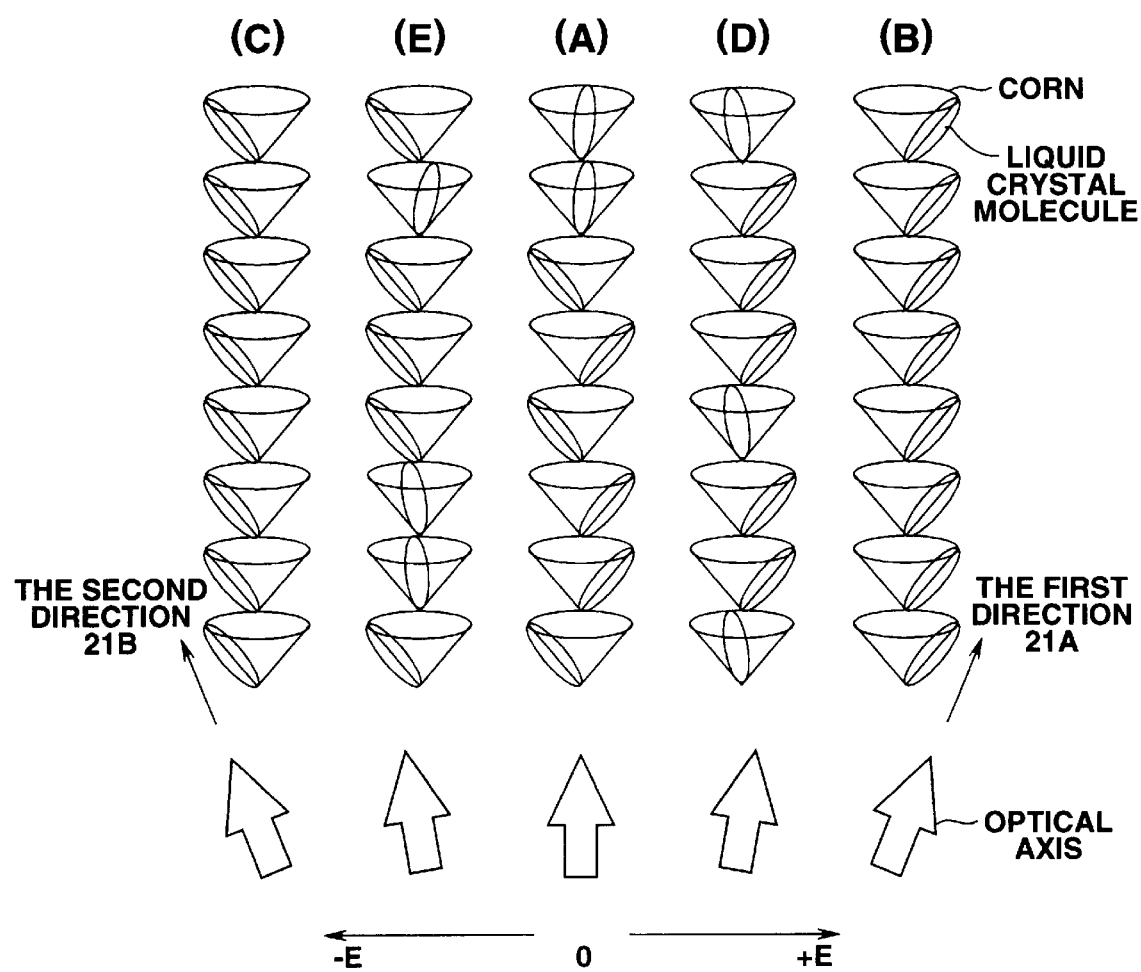
FIGS. 20(A) to 20(E) are diagrams showing the relationship between the applied voltage and the alignment of the liquid crystal molecules.

By applying a satisfactorily high voltage having a positive polarity (which is equal to or greater than the saturation voltage) to the LC layer 21 which is in the ferrielectric phase and which has the molecular arrangement shown in FIG. 20(A), the LC molecules are aligned substantially in the first direction 21A, as shown in FIG. 20(D). Under this condition, the spontaneous polarizations of the LC molecules are directed in substantially the same direction, and the LC exhibits the first ferroelectric phase.

By applying a satisfactorily high voltage having a negative polarity (which is equal to or less than the saturation voltage) to the LC layer 21, the LC molecules are aligned substantially in the second direction 21B as shown in FIG. 20(E). Under this condition, the spontaneous polarizations of the LC molecules are directed substantially in the same direction, and the LC exhibits the second ferroelectric phase.

In the above-described cases, the optical axis of the LC layer 21 is substantially coincident with the first direction 21A or the second direction 21B.

The molecular orientational order is weakened at the interface between the LC layer 21 and the alignment films 18 and 19, due to the alignment forces of the alignment films 18 and 19, and the LC molecules are able to easily move along imaginary cones. The ferrielectric molecular orientational order is disordered relatively easily due to the surface effect occurring at the interface between the LC layer 21 and the alignment films 18 and 19. Hence, when an intermediate voltage is applied to the LC layer 21, some LC molecules behave (move) along imaginary cones traced by the molecules exhibiting the chiral smectic CA phase, and become tilted with respect to the major surfaces of the substrates 11 and 12, as shown in FIG. 7.

Figure 21:
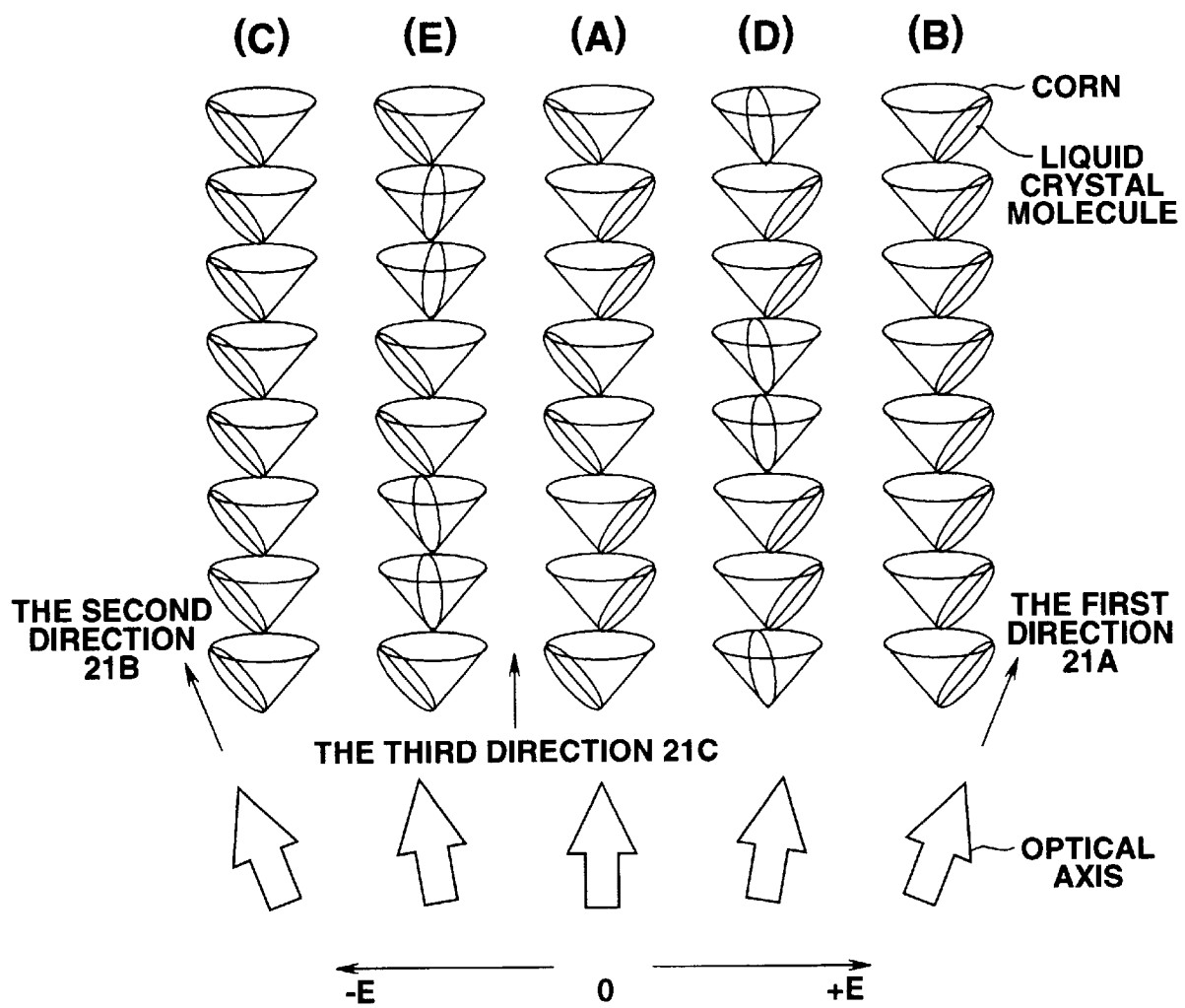
FIG. 21(A) to 21(E) are diagrams showing the relationship between the applied voltage and the alignment of the liquid crystal molecules.

While a voltage is being applied to the LC layer 21, fine domains and the LC molecules aligned being tilted with respect to the surfaces of the substrates, are present in the LC layer 21, as shown in FIGS. 21(B) and 21(C). Those fine domains exhibit the ferroelectric phase wherein the LC molecules in adjacent smectic layers are aligned in the first direction 21A or the second direction 21B.

As the applied voltage is intensified, the number of LC molecules aligned in the first direction 21A or the second direction 21B decreases, whereas the number of LC molecules aligned in the second direction 21B or the first direction 21A increases according to the polarity of the applied voltage. The number of LC molecules tilted with respect to the substrate surfaces also increases.

In the second embodiment, the phase which the LC layer 21 exhibits when applied with the intermediate voltage is referred to as the second mixed phase, because the LC layer 21 contains the LC molecules exhibiting the first and second ferroelectric phases and those tilted with respect to the substrate surfaces.

The second mixed phase or the state wherein the LC molecules exhibiting the first and second ferroelectric phases and those tilted with respect to the substrate surfaces are contained in the LC layer 21, is the same as that shown in FIG. 8 of the first embodiment.

The ratio between the number of LC molecules exhibiting the first and second ferroelectric phases and that of LC molecules exhibiting the intermediate phase, and the mean alignment direction of LC molecules exhibiting the intermediate phase (an alignment direction projected on the major surface of a substrate) vary continuously according to the polarity and value of the applied voltage.

Due to this, the director (the mean alignment direction of the LC molecules) of the liquid crystal vary continuously between the first and second directions 21A and 21B in accordance with the applied voltage, as shown in FIGS. 20(A) to 20(E).

When the optical characteristic of the LCD device having the above-described structure is shown in the form of a graph, it does not trace a horizontal line in the vicinity of an applied voltage of 0V, and smoothly varies continuously in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage is applied to the LC layer, the transmittance becomes saturated. Moreover, the hysteresis is considerably minor.

A liquid crystal composition was prepared by processing one having the skeleton expressed in Chemical Formula 1 and having the properties shown in Table 1. Using a liquid crystal containing thus prepared liquid crystal composition as the main component, the LC layer 21 was formed to manufacture an LCD device (of Example 3 according to the present invention). The cell gap was set at 1.5 microns so that the helical structure traced by the molecules of the LC layer 21 was broken. The relationship between the applied voltage and the transmittance was measured applying rectangular-waveform voltages to the opposite electrodes 13 and 17, and as a result, substantially the same electro-optical characteristic as that shown in FIG. 9A of the first embodiment was attained in regard to the LCD device of Example 3.

The applied voltage versus transmittance characteristic of the LCD device of Example 3 does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high. Applied voltages and transmittances are substantially in one-to-one correspondence with each other. This permits halftones to be reliably displayed, and enables high-contrast display images to be assuredly attained.

Thus, the LC molecules of the LC layer 21 according to the second embodiment behave along the cones in accordance with the applied voltage, and the state of the alignment of the LC molecules changes from the first/second alignment state to the second/first alignment state as a result. Under this condition, the mean alignment direction of the LC layer 21 varies continuously in accordance with the applied voltage such that the transmittance varies continuously. This permits an image to be displayed at the desired gradation.

Third Embodiment

The LCD device of to the third embodiment of the present invention will now be described.

The basic structure of the LCD device of the third embodiment is substantially the same as that of the LCD device of the first embodiment shown in FIGS. 1 to 4.

The LCD layer 21 of the third embodiment is formed of a liquid crystal whose main component is a liquid crystal composition having the skeleton shown in Chemical Formula 1, for example, and has the properties shown in Table 1. In the bulk state, the liquid crystal exhibits the chiral smectic CA (SmCA*) phase. The surface energy dispersion forces (esd) of the alignment films 18 and 19 range from approximately 38 to 41 dyn/cm, while the van der Waals forces (esp) range from approximately 4 to 10 dyn/cm. Those matters are basically the same as those of the LCD device of the first embodiment.

However, the alignment forces of the alignment films 18 and 19 according to the third embodiment are stronger than those of the alignment films of the second embodiment. The intermolecular forces acting between the molecules of the liquid crystal employed in the third embodiment are weaker than the aligning forces of the alignment films of the second embodiment. The LC molecules are subjected to the aligning forces conferred on the alignment films 18 and 19 through the alignment treatment. Those aligning forces are stronger than the aligning forces to which the LC molecules are subjected in the first embodiment. Under the above-described conditions, (1) the LC layer 21 of the third embodiment, when sealed between the substrates 11 and 12 and applied with no voltage, exhibits a mixed phase wherein the LC layer contains the LC molecules exhibiting the antiferroelectric phase, the LC molecules exhibiting the ferroelectric phase(s), and the LC molecules aligned in other phases which differ in orientational order (alignment order) from the antiferroelectric and ferroelectric phases; (2) the LC layer exhibits the mixed phase even when it is applied with a voltage; and (3) the LC layer, when applied with a satisfactorily high voltage, exhibits the first or second ferroelectric phase in accordance with the polarity of the applied voltage.

The molecular orientational order is weakened at the interface between the LC layer 21 and the alignment films 18 and 19, due to the alignment forces of the alignment films 18 and 19, and the LC molecules are able to easily move along imaginary cones. Furthermore, in this embodiment, the aligning forces to align the LC molecules are stronger than the interactions acting between the LC molecules.

Therefore, as shown in FIG. 7, some LC molecules behave (move) along imaginary cones traced by the molecules exhibiting the chiral smectic CA phase, and the direction of the alignment of those LC molecules is reversed, while some LC molecules are tilted with respect to the major surfaces of the substrates 11 and 12.

More specifically, fine domains exhibiting the ferroelectric phase wherein the LC molecules in adjoining smectic layers are aligned in the first direction 21A or the second direction 21B, fine domains exhibiting the antiferroelectric phase wherein the LC molecules are aligned alternately in the first direction 21A and the second direction 21B, the LC molecules tilted with respect to the substrate surfaces, and fine domains in which the LC molecules are aligned in the ferrielectric order, are present in the LC layer 21.

In the third embodiment, an optical characteristic corresponding to the average of the characteristics of those fine domains is attained.

In the third embodiment, the LC layer 21, when sealed between the pair of substrates, becomes the state wherein the LC molecules exhibiting the antiferroelectric phase, those exhibiting the ferroelectric phase(s), those aligned the intermediate alignment state and those exhibiting the ferrielectric phase are contained in the LC layer, due to the aligning forces of the alignment films 18 and 19. This state is referred to as the third mixed phase.

As the applied voltage is intensified, the number of LC molecules aligned in the first or the second direction decreases, whereas the number of LC molecules aligned in the second or first direction increases according to the polarity of the applied voltage. Further, the LC molecules which initially have a tilt with respect to the substrate surfaces are aligned in the second or first direction. The number of tilted LC molecules also increases.

In the case of the third mixed phase, the ratio between the number of LC molecules exhibiting the antiferroelectric phase, that of LC molecules exhibiting the ferroelectric phase(s) and that of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the liquid crystal vary continuously between the first and second directions 21A and 21B in accordance with the applied voltage, as shown in FIGS. 21(A) to 21(C).

By applying a satisfactorily high voltage having a positive polarity (which is equal to or greater than the saturation voltage) to the LC layer 21 which is in the mixed phase and which has the molecular arrangement shown in FIG. 21(A), the LC molecules are aligned substantially in the first direction 21A, as shown in FIG. 21(D). Under this condition, the spontaneous polarizations of the LC molecules are directed in substantially the same direction, and the LC exhibits the first ferroelectric phase.

By applying a satisfactorily high voltage having a negative polarity (which is equal to or less than the saturation voltage) to the LC layer 21, the LC molecules are aligned substantially in the second direction 21B as shown in FIG. 21(E). Under this condition, the spontaneous polarizations of the LC molecules are directed substantially in the same direction, and the LC exhibits the second ferroelectric phase.

In the above-described cases, the optical axis of the LC layer 21 is substantially coincident with the first direction 21A or the second direction 21B.

When the optical characteristic of the LCD device having the above-described structure is shown in the form of a graph, it does not trace a horizontal line in the vicinity of an applied voltage of 0V, and smoothly varies continuously in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage Ec is applied to the LC layer, the transmittance becomes saturated. Moreover, the hysteresis is considerably minor.

A liquid crystal composition was prepared by processing one having the skeleton expressed in Chemical Formula 1 and having the properties shown in Table 1. Using a liquid crystal containing thus prepared liquid crystal composition as the main component, the LC layer 21 was formed to manufacture an LCD device (Example 4 according to the present invention). The cell gap was set at 1.5 microns so that the helical structure traced by the molecules of the LC layer 21 was broken. The relationship between the applied voltage and the transmittance was measured applying rectangular-waveform voltages to the opposite electrodes 13 and 17, as a result of which the same electro-optical characteristic as that shown in FIG. 9A of the first embodiment was attained in regard to the LCD device of Example 4.

As in the case of the first embodiment, the applied voltage versus transmittance characteristic of the LCD device of Example 4 does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high. Applied voltages and transmittances are substantially in one-to-one correspondence with each other. This ensures the reliable display of halftones and high-contrast images.

Thus, the LC molecules of the LC layer 21 according to the third embodiment behave along the cones in accordance with the applied voltage, and the state of the alignment of the LC molecules changes from the first/second alignment state to the second/first alignment state as a result. Under this condition, the mean alignment direction of the LC layer 21 varies continuously in accordance with the applied voltage such that the transmittance varies continuously. Therefore, an image can be displayed at the desired gradation.

Fourth Embodiment

The LCD device of to the fourth embodiment of the present invention will now be described.

The basic structure of the LCD device of the fourth embodiment is substantially the same as that of the LCD device of the first embodiment shown in FIGS. 1 to 4.

The LCD layer 21 of the fourth embodiment is formed of a liquid crystal whose main component is a liquid crystal composition having the skeleton shown in Chemical Formula 1, for example, and has the properties shown in Table 1. In the bulk state, the liquid crystal exhibits the chiral smectic CA(SmCA*) phase. Those matters are basically the same as those of the LCD device of the first embodiment.

In the fourth embodiment, however, the surface energy dispersion forces (esd) of the alignment films 18 and 19 range from approximately 30 to 50 dyn/cm, while the van der Waals forces (esp) range from approximately 3 to 20 dyn/cm.

In the fourth embodiment, (1) the LC layer 21, when applied with a satisfactorily high voltage, exhibits the ferroelectric phase wherein the LC molecules are aligned substantially in the first direction 21A or second direction 21B shown in FIG. 3, in accordance with the polarity of the applied voltage; and (2) the LC layer 21, when applied with an intermediate voltage, exhibits the mixed phase in which the LC molecules aligned being tilted with respect to the major surfaces of the substrates 11 and 12, and the LC molecules aligned in the smectic interlayer order, are mixed.

The above-described LC layer 21 is subjected to the interactions (surface effect) at the interface between the LC layer 21 and the alignment films 18 and 19, in other words, the aligning forces conferred on the aligning films 18 and 19 through the alignment treatment. Because of the relationship between the aligning forces and the intermolecular forces to keep the LC material exhibit the antiferroelectric phase, the LC layer 21 exhibits any one of (1) the ferroelectric phase (s), (2) the antiferroelectric phase, (3) the ferrielectric phase and (4) the mixed phase.

(1) In the case where the intermolecular forces between the molecules forming the LC layer 21 are intense and the intermolecular forces to maintain the antiferroelectric molecular orientational order are satisfactorily stronger than the aligning forces, the LC layer 21 exhibits the antiferroelectric phase, as in the case of the bulk state.

More specifically, the thickness (cell gap) of the LC layer 21 is nearly equal to 1 pitch (natural pitch) of the helical structure of the LC material. The LC molecules are subjected to the aligning forces conferred on the alignment films 18 and 19 through the alignment treatment. However, the intermolecular forces to maintain the antiferroelectric phase of the molecules of the LC material are stronger than the alignment forces conferred on the alignment films through the alignment treatment. Due to this, as schematically shown in FIGS. 5 and 6(A), the LC molecules exhibit the antiferroelectric phase wherein the double helical structure has been broken.

When no voltage is applied to the LC layer 21, the LC molecules in adjacent smectic layers are aligned alternately in the first direction 21A and the second direction 21B, and the director (the mean direction of the long axes of the LC molecules) is substantially coincident with the direction (the third direction 21C) of the normal line of the (smectic) layers of the layer structure of an SmCA* liquid crystal. In this case, the spontaneous polarizations Ps of the LC molecules in the smectic layers are directed in opposite directions as shown in FIG. 5, and the spontaneous polarizations of the LC molecules in adjacent smectic layers cancel out each other. The spatially mean optical axis of the LC layer 21 is substantially coincident with the direction (the third direction 21C) of the normal line of the smectic layers.

By applying a satisfactorily high voltage having a positive polarity (which is equal to or greater than the saturation voltage) to the LC layer 21, the LC molecules are aligned substantially in the first direction 21A, as shown in FIG. 6(B). In this state, the spontaneous polarizations of the LC molecules are directed in substantially the same direction, and the LC exhibits the first ferroelectric phase. By applying a satisfactorily high voltage having a negative polarity (which is equal to or less than the saturation voltage) to the LC layer 21, the LC molecules are aligned substantially in the second direction 21B as shown in FIG. 6(C). In this state, the spontaneous polarizations of the LC molecules are directed substantially in the same direction, and the LC exhibits the second ferroelectric phase.

By the aligning forces of the alignment films 18 and 19, the alignment order of the LC molecules forming the LC layer 21 is weakened at the interface between the LC layer 21 and the alignment films 18 and 19, and the LC molecules are able to easily move along imaginary cones, as shown in FIG. 7. Moreover, the gap in potential energy between the antiferroelectric and ferroelectric phases is small, and the antiferroelectric molecular orientational order is liable to disorder, due to the surface effect at the interface between the LC layer 21 and the alignment films 18 and 19. Under those conditions, when the intermediate voltage is applied to the LC layer 21, some LC molecules behave (move) along the imaginary cones traced by the molecules exhibiting the chiral smectic CA phase, and become tilted with respect to the major surfaces of the substrates 11 and 12.

Figure 6:
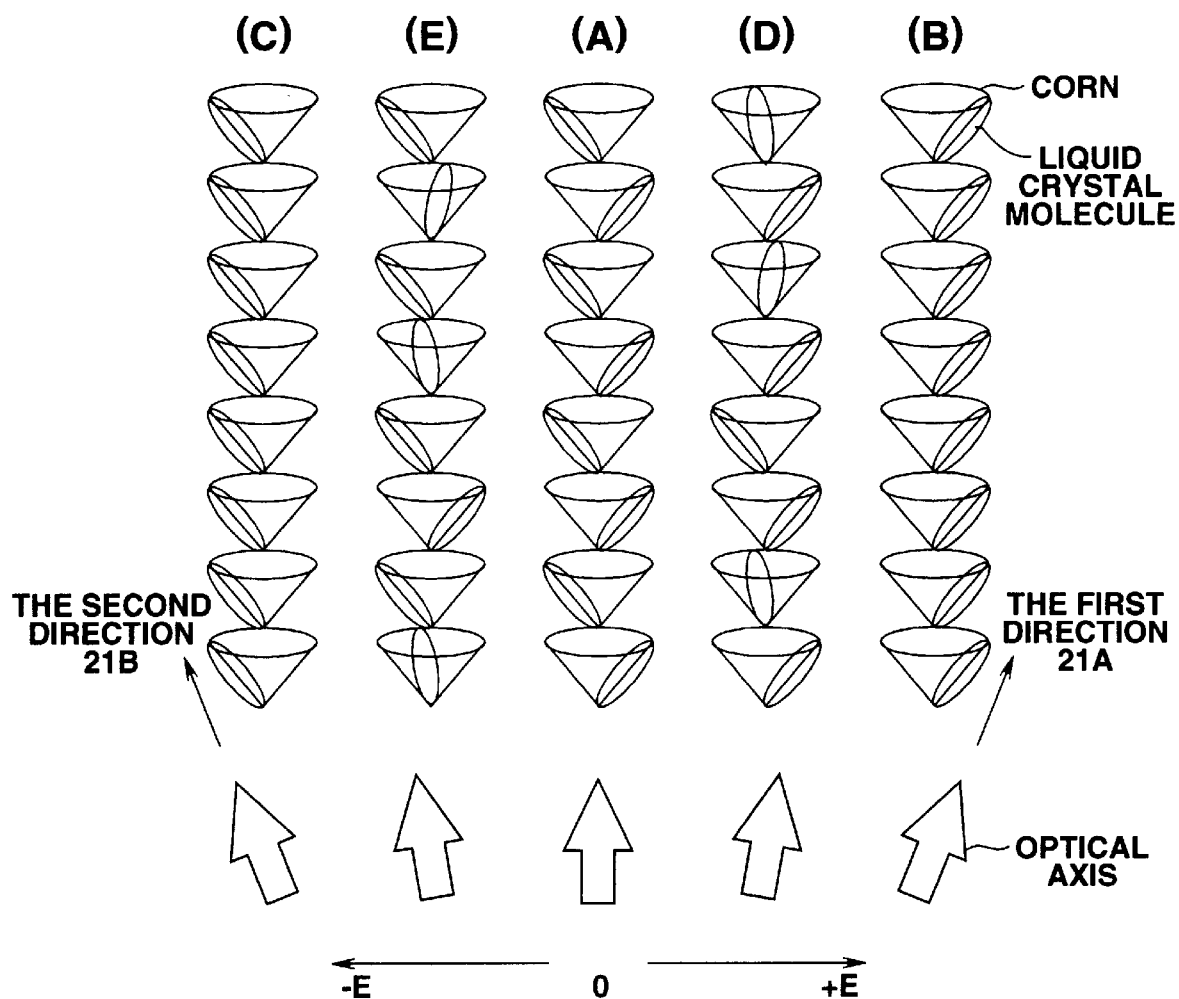
FIGS. 6A to 6E are diagrams showing the relationship between the applied voltage and the alignment of the liquid crystal molecules.

While a low voltage is being applied to the LC layer 21, the LC layer becomes the state wherein the LC molecules exhibiting the antiferroelectric phase (the molecules which maintain the antiferroelectric orientational order shown in FIG. 6) and the LC molecules tilted with respect to the substrate surfaces as shown in FIGS. 8 and 6(D) and 6(E), are contained in the LC layer.

As the applied voltage is intensified, the number of LC molecules exhibiting the antiferroelectric phase (molecules which preserve the antiferroelectric orientational order shown in FIG. 6(A)) decreases, whereas the number of LC molecules tilted with respect to the substrate surfaces increases. Some LC molecules are reversed in the direction of the alignment, and become the molecules exhibiting the ferroelectric phase(s) (the molecules having the ferroelectric orientational order). In consequence, the LC layer 21 becomes the state wherein the LC molecules exhibiting the antiferroelectric phase, those exhibiting the ferroelectric phase(s) and those exhibiting the intermediate phase and aligned having a tilt are contained in the LC layer.

Thus, the LC layer 21 contains the LC molecules exhibiting the antiferroelectric, ferroelectric and intermediate phases. In this case, an optical characteristic corresponding to the average of the characteristics of fine domains formed of the LC molecules exhibiting the antiferroelectric phase, fine domains formed of the LC molecules exhibiting the ferroelectric phase(s) and fine domains formed of the LC molecules exhibiting the intermediate phase, is attained.

In the fourth embodiment, the state wherein the LC molecules aligned in the intermediate phase with the molecules having a tilt respect to the major surfaces of the substrates, and the LC molecules aligned in other phases, are present in the LC layer 21 is referred to as the fourth mixed phase.

In the case of the fourth mixed phase, the ratio between the number of LC molecules exhibiting the antiferroelectric phase, that of LC molecules exhibiting the ferroelectric phase(s) and that of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the liquid crystal vary continuously between the first and second directions 21A and 21B in accordance with the applied voltage, as shown in FIGS. 6(A) to 6(E).

(2) When the intermolecular forces acting between the molecules of the LC material forming the LC layer 21 are relatively weak and when the aligning forces are stronger than the intermolecular forces to maintain the antiferroelectric phase, the LC molecules of the LC layer 21 are influenced by the aligning forces such that they are out of the antiferroelectric orientational order. Under this condition, when the difference between the energy of the antiferroelectric molecular alignment and the energy of the ferroelectric molecular alignment is relatively small and when its threshold value is indefinite, the antiferroelectric orientational order breaks, and the LC layer sealed between the substrates 11 and 12 exhibits, in units of fine domains, the ferrielectric phase wherein the LC molecules whose double helical structure has been broken are aligned in the smectic interlayer order.

In the ferrielectric phase, as shown in FIGS. 18 and 19, the LC molecules are aligned with their long axes being set in the first direction 21A or the second direction 21B, and no LC molecules exhibits the intermediate phase. However, unlike in the antiferroelectric phase, a layer whose molecules are aligned in the first direction 21A and a layer whose molecules are aligned in the second direction 21B do not alternate, and the LC molecules are aligned in the same direction in units of fine domains.

In other words, fine domains which are in the first alignment state wherein the LC molecules are aligned in the first direction, and fine domains which are in the second alignment state wherein the LC molecules are aligned in the second direction, are present in the LC layer 21.

In this case, the spontaneous polarizations Ps of the LC molecules in a fine domain which is in the first alignment state wherein the LC molecules are aligned in the first direction, and the spontaneous polarizations Ps of the LC molecules in its adjoining fine domain which is in the second alignment state wherein the LC molecules are aligned in the second direction, cancel out each other. Moreover, the spatially mean optical axis of the LC layer 21 is substantially coincident with the direction (the third direction 21C) of the normal line of the smectic layers.

By applying a satisfactorily high voltage having a positive polarity (which is equal to or greater than the saturation voltage) to the LC layer 21 which is in the ferrielectric phase and whose molecules are aligned as shown in FIG. 20(A), the LC molecules are aligned substantially in the first direction 21A, as shown in FIG. 20(B). In this state, the spontaneous polarizations of the LC molecules are directed in substantially the same direction, and the LC exhibits the first ferroelectric phase. By applying a satisfactorily high voltage having a negative polarity (which is equal to or less than the saturation voltage) to the LC layer 21, the LC molecules are aligned substantially in the second direction 21B as shown in FIG. 20(C). In this state, the spontaneous polarizations of the LC molecules are directed substantially in the same direction, and the LC exhibits the second ferroelectric phase.

Under the above-described conditions, the optical axis of the LC layer 21 extends in substantially the same direction as the first direction 21A or the second direction 21B.

As discussed previously, the alignment order of the LC molecules forming the LC layer 21 is weakened at the interface between the LC layer 21 and the alignment films 18 and 19 by the aligning forces of the alignment films 18 and 19, and the LC molecules are able to easily move along imaginary cones. Moreover, the ferrielectric molecular orientational order is liable to disorder due to the surface effect at the interface between the LC layer 21 and the aligning films 18 and 19. When the intermediate voltage is applied to the LC layer 21, some LC molecules behave (move) along the imaginary cones traced by the molecules exhibiting the chiral smectic CA phase, and become tilted with respect to the major surfaces of the substrates 11 and 12, as shown in FIG. 7.

While a voltage is being applied to the LC layer 21, the LC layer exhibits the mixed phase wherein ferroelectric (or ferrielectric) fine domains, in which adjacent LC molecules are aligned in the first direction 21A or the second direction 21B as shown in FIGS. 20(D) and 20(E), and the LC molecules tilted with respect to the substrate surfaces, are present in the LC layer 21.

As the applied voltage is intensified, the number of LC molecules aligned in the first/second direction decreases, while the number of LC molecules aligned in the second/first direction increases. The number of LC molecules tilted with respect to the substrate surfaces also increases.

The above-mentioned mixed phase, wherein the LC molecules aligned in the first direction 21A, those aligned in the second direction 21B and those tilted with respect to the substrate surfaces are mixed, is as shown in FIG. 8.

In this mixed phase, the ratio between the number of LC molecules exhibiting the antiferroelectric phase, that of LC molecules exhibiting the ferroelectric phase(s) and that of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the LC vary continuously between the first and second directions 21A and 21B in accordance with the applied voltage, as shown in FIGS. 20(A) to 20(E).

(3) Let it be assumed that the intermolecular forces acting between the molecules of the LC material forming the LC layer 21 are relatively weak, the aligning forces are stronger than the intermolecular forces to maintain the antiferroelectric phase and are stronger than such aligning forces as would cause the LC layer to exhibit the ferrielectric phase, and the difference between the energy of the antiferroelectric molecular alignment and the energy of the ferroelectric molecular alignment is small and indefinite. In this case, due to the aligning forces, some LC molecules become the intermediate state of being aligned having a tilt with respect to the major surfaces of the substrates on the cones traced by the molecules exhibiting the smectic CA phase. The LC molecules sealed between the substrates exhibit the mixed phase wherein the double helical structure has been broken.

In other words, ferroelectric fine domains in which adjacent LC molecules are aligned in the first direction 21A or the second direction 21B, antiferroelectric fine domains in which adjacent LC molecules are aligned alternately in the first direction 21A and the second direction 21B, and intermediate-phase fine domains containing LC molecules tilted with respect to the substrate surfaces, are present in the LC layer 21. An optical characteristic corresponding to the average of the characteristics of those fine domains, is attained.

When a voltage is applied to the LC layer 21, the number of LC molecules aligned in the first/second direction decreases, while the number of LC molecules aligned in the second/first direction increases. The LC molecules which initially have a tilt with respect to the substrate surfaces are aligned in the second direction 21B or the second direction 21A. The number of tilted LC molecules also increases.

In this mixed phase, the ratio between the number of LC molecules exhibiting the antiferroelectric phase, that of LC molecules exhibiting the ferroelectric phase(s) and that of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the LC vary continuously between the first and second directions 21A and 21B in accordance with the applied voltage, as in the case of FIGS. 20(A) to 20(E).

By applying a satisfactorily high voltage having a positive polarity (which is equal to or greater than the saturation voltage) to the LC layer 21 which is in the mixed phase and whose molecules are aligned as shown in FIG. 21(A), the LC molecules are aligned substantially in the first direction 21A, as shown in FIG. 21(B). In this state, the spontaneous polarizations of the LC molecules are directed in substantially the same direction, and the LC exhibits the first ferroelectric phase. By applying a satisfactorily high voltage having a negative polarity (which is equal to or less than the saturation voltage) to the LC layer 21, the LC molecules are aligned substantially in the second direction 21B as shown in FIG. 21(C). In this state, the spontaneous polarizations of the LC molecules are directed substantially in the same direction, and the LC exhibits the second ferroelectric phase.

Under the above-described conditions, the optical axis of the LC layer 21 extends in substantially the same direction as the first direction 21A or the second direction 21B.

Further, when an intermediate voltage is applied to the LC layer 21, the LC layer 21 becomes the state wherein fine domains containing the LC molecules aligned in the first direction 21A, those containing the LC molecules aligned in the second direction 21B, those containing the LC molecules aligned alternately in the first direction 21A and the second direction 21B, and those containing the LC molecules aligned having a tilt with respect to the major surfaces of the substrates, are mixed as shown in FIGS. 21(D) and 21(E).

Due to this, the director (the mean alignment direction of the LC molecules) of this LC vary continuously between the first and second directions 21A and 21B in accordance with the applied voltage, as shown in FIGS. 21(A) to 21(E).

In the case of any one of the above-described alignment characteristics (1) to (3), the director of the LC layer 21 is substantially coincident with the third direction 21C while no voltage is being applied to the LC layer 21, and the director varies continuously between the first direction 21A and the second direction 21B in accordance with the applied voltage.

Therefore, when the optical characteristic of the LCD device having the above-described structure is shown in the form of a graph, it does not trace a horizontal line in the vicinity of an applied voltage of 0V, and smoothly varies continuously in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage is applied to the LC layer, the transmittance becomes saturated. Moreover, the hysteresis is considerably minor.

The LCD device (Example 5) according to this embodiment has the electro-optical characteristic which is shown in FIG. 9A as the relationship between the applied voltage and the transmittance.

The LC layer 21 of this LCD device is formed of a liquid crystal whose main component is a liquid crystal composition which has been attained by processing the liquid crystal composition having the skeleton expressed in Chemical Formula 1 and having the properties shown in Table 1. The LC layer 21 is sealed with the cell gap being set at 1.5 microns and in the state wherein the helical structure traced by the molecules of the LC layer 21 has been broken.

The alignment films 18 and 19 of the above LCD device are formed of an organic high molecular compound such as polyimide, and are approximately 25 nm to 35 nm in thickness. The alignment films 18 and 19 have been subjected to rubbing. The surface energy dispersion forces (esd) of the alignment films 18 and 19 range from 38 to 41 dyn/cm, while the van der Waals forces (esp) of the alignment films 18 and 19 range from approximately 4 to 10 dyn/cm.

The applied voltage versus transmittance characteristic of the LCD device of Example 5 does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high. Applied voltages and transmittances are substantially in one-to-one correspondence with each other. This ensures the reliable display of halftones and high-contrast images.

Thus, the LC molecules of the LC layer 21 according to this embodiment behave along the cones in accordance with the applied voltage, and the state of the alignment of the LC molecules changes from the first/second alignment state to the second/first alignment state as a result. Under this condition, the mean alignment direction of the LC layer 21 varies continuously in accordance with the applied voltage such that the transmittance varies continuously. Therefore, an image can be displayed at the desired gradation.

Fifth Embodiment

The LCD device of the fifth embodiment of the present invention will now be described.

The basic structure of the LCD device of the fifth embodiment is substantially the same as that of the LCD device of the first embodiment shown in FIGS. 1 to 4.

The LCD layer 21 of the fifth embodiment is formed of a liquid crystal whose main component is a liquid crystal composition having the skeleton shown in Chemical Formula 1, for example, and has the properties shown in Table 1. In the bulk state, the liquid crystal exhibits the chiral smectic CA(SmCA*) phase. Those matters are basically the same as those of the LCD device of the first embodiment.

In the fifth embodiment, however, the surface energy dispersion forces (esd) of the alignment films 18 and 19 range from approximately 30 to 50 dyn/cm, while the van der Waals forces (esp) range from approximately 3 to 20 dyn/cm.

In the fifth embodiment, (1) the LC layer 21, when applied with a satisfactorily high voltage, exhibits the ferroelectric phase wherein the LC molecules are aligned substantially in the first direction 21A or second direction 21B shown in FIG. 3, in accordance with the polarity of the applied voltage; and (2) the LC layer 21, when applied with an intermediate voltage, exhibits the mixed phase wherein the LC molecules aligned being tilted with respect to the major surfaces of the substrates 11 and 12, and the LC molecules aligned in the smectic interlayer order, are mixed.

The above-described LC layer 21 is subjected to the interactions (surface effect) at the interface between the LC layer 21 and the alignment films 18 and 19, in other words, the aligning forces conferred on the aligning films 18 and 19 through the alignment treatment. Because of the relationship between the aligning forces and the intermolecular forces acting between the molecules of the LC layer 21, the LC layer 21 exhibits any one of (1) the ferroelectric phase(s), (2) the antiferroelectric phase, (3) the ferrielectric phase and (4) the mixed phase.

(1) In the case where the intermolecular forces between the molecules forming the LC layer 21 are intense and the intermolecular forces to maintain the antiferroelectric molecular orientational order are satisfactorily stronger than the aligning forces, the LC layer 21 exhibits the antiferroelectric phase, as in the case of the bulk state.

More specifically, the thickness (cell gap) of the LC layer 21 is nearly equal to 1 pitch (natural pitch) of the helical structure of the LC material. The LC molecules are subjected to the aligning forces conferred on the alignment films 18 and 19 through the alignment treatment. However, the intermolecular forces of the LC are stronger than the alignment forces conferred on the alignment films 18 and 19 through the alignment treatment. Accordingly, as schematically shown in FIGS. 5 and 6(A), the LC molecules exhibit the antiferroelectric phase wherein the double helical structure has been broken.

When no voltage is applied to the LC layer 21, the double helical structure traced by the LC molecules breaks. In one of adjoining smectic layers, the LC molecules are aligned in the first direction 21A shown in FIG. 3, while in the other smectic layer, the LC molecules are aligned in the second direction 21B shown in FIG. 3. In short, the LC molecules are aligned alternately in the first direction 21A and the second direction 21B. The director (the mean direction of the long axes of the LC molecules) is substantially coincident with the direction (the third direction 21C) of the normal line of the (smectic) layers of the layer structure which a SmCA* liquid crystal has. The spontaneous polarizations Ps of the LC layers in adjacent smectic layers are directed in the opposite directions as shown in FIG. 5, and cancel out each other. The spatially mean optical axis of the LC layer 21 extends in substantially the same direction (the third direction 21C) as that of the normal line of the smectic layers.

By applying a satisfactorily high voltage having a positive polarity (which is equal to or greater than the saturation voltage) to the LC layer 21, the LC molecules are aligned substantially in the first direction 21A, as shown in FIG. 6(B). In this state, the spontaneous polarizations of the LC molecules are directed in substantially the same direction, and the LC exhibits the first ferroelectric phase. By applying a satisfactorily high voltage having a negative polarity (which is equal to or less than the saturation voltage) to the LC layer 21, the LC molecules are aligned substantially in the second direction 21B as shown in FIG. 6(C). In this state, the spontaneous polarizations of the LC molecules are directed substantially in the same direction, and the LC exhibits the second ferroelectric phase.

Under the above-described conditions, the optical axis of the LC layer 21 extends in substantially the same direction as the first direction 21A or the second direction 21B.

As described previously, the alignment order of the LC molecules forming the LC layer 21 is weakened at the interface between the LC layer 21 and the alignment films 18 and 19 by the aligning forces of the alignment films 18 and 19, and the LC molecules are able to easily move along imaginary cones, as shown in FIG. 7. Moreover, the gap in potential energy between the antiferroelectric and ferroelectric phases is small, and the antiferroelectric molecular orientational order is liable to disorder due to the surface effect at the interface between the LC layer 21 and the aligning films 18 and 19. When an intermediate voltage is applied to the LC layer 21, some LC molecules behave (move) along the imaginary cones traced by the molecules exhibiting the chiral smectic CA phase, and become tilted with respect to the major surfaces of the substrates 11 and 12, as shown in FIG. 7.

When a low voltage is applied to the LC layer 21, the LC layer 21 becomes the state wherein the LC molecules exhibiting the antiferroelectric phase (the molecules preserving the antiferroelectric orientational order shown in FIG. 5) and the LC molecules having a tilt with respect to the substrate surfaces as shown in FIGS. 8 and 6(D) and 6(E) are present over the entire thickness of the LC layer 21. Since the LC layer 21 is thin and its thickness is on the order of 1.5 microns, the aligning forces of the alignment films 18 and 19 affect even the LC molecules present in the central part of the LC layer 21 such that the LC layer 21 exhibits, over the entirety of its thickness, the state wherein the LC molecules exhibiting the antiferroelectric phase and the LC molecules having a tilt are mixed.

As the applied voltage is intensified, the number of LC molecules exhibiting the antiferroelectric phase (molecules preserving the antiferroelectric orientational order shown in FIG. 6(A)) decreases, while the number of LC molecules having a tilt with respect to the substrate surfaces increases. Some molecules are reversed in the direction of the alignment, and become the molecules exhibiting the ferroelectric phase(s) (the molecules having the ferroelectric orientational order). As a result, the LC layer 21 exhibits, over the entirety of its thickness, the state wherein the LC molecules exhibiting the antiferroelectric phase, those exhibiting the ferroelectric phase(s) and those exhibiting the intermediate phase and aligned having a tilt, are mixed.

In this state, the LC layer 21 contains the LC molecules exhibiting the antiferroelectric, ferroelectric and intermediate phases. Consequently, an optical characteristic corresponding to the average of the characteristics of fine domains formed of the LC molecules exhibiting the antiferroelectric phase, fine domains formed of the LC molecules exhibiting the ferroelectric phase(s) and fine domains formed of the LC molecules exhibiting the intermediate phase, is attained.

In the fifth embodiment, the state wherein the LC molecules tilted having a tilt with respect to the major surfaces of the substrates and the LC molecules aligned in other phases are mixed, is referred to as the fifth mixed phase.

In the fifth mixed phase, the ratio between the number of LC molecules exhibiting the antiferroelectric phase, the number of LC molecules exhibiting the ferroelectric phase (s) and the number of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the LC vary continuously between the first and second directions 21A and 21B in accordance with the applied voltage, as shown in FIGS. 6(A) to 6(E).

(2) When the aligning forces are stronger than the intermolecular forces acting between the molecules of the LC material forming the LC layer 21, the LC molecules of the LC layer 21 are influenced by the aligning forces such that they are out of the antiferroelectric orientational order. Under this condition, when the difference between the energy of the antiferroelectric molecular alignment and the energy of the ferroelectric molecular alignment is relatively small and when its threshold value is indefinite, the antiferroelectric orientational order breaks, and the LC layer sealed between the substrates 11 and 12 exhibits, in units of fine domains, the ferrielectric phase wherein the LC molecules whose double helical structure has been broken are aligned in the smectic interlayer order.

In the ferrielectric phase, as shown in FIGS. 18 and 19, the double helical structure has been broken, and the LC molecules are aligned with their long axes being set in the first direction 21A or the second direction 21B. No LC molecules exhibit the intermediate phase. However, unlike in the antiferroelectric phase, a layer whose molecules are aligned in the first direction 21A and a layer whose molecules are aligned in the second direction 21B do not alternate, and the LC molecules are aligned in the same direction in units of fine domains.

In other words, fine domains which are in the first alignment state wherein the LC molecules are aligned in the first direction, and fine domains which are in the second alignment state wherein the LC molecules are aligned in the second direction, are present in the LC layer 21.

In this case, the spontaneous polarizations Ps of the LC molecules in a fine domain which is in the first alignment state wherein the LC molecules are aligned in the first direction, and the spontaneous polarizations Ps of the LC molecules in its adjoining fine domain which is in the second alignment state wherein the LC molecules are aligned in the second direction, cancel out each other. Moreover, the spatially mean optical axis of the LC layer 21 is substantially coincident with the direction (the third direction 21C) of the normal line of the smectic layers.

By applying a satisfactorily high voltage having a positive polarity (which is equal to or greater than the saturation voltage) to the LC layer 21 which is in the ferrielectric phase and whose molecules are aligned as shown in FIG. 20(A), the LC molecules are aligned substantially in the first direction 21A, as shown in FIG. 20(B). In this state, the spontaneous polarizations of the LC molecules are directed in substantially the same direction, and the LC exhibits the first ferroelectric phase. By applying a satisfactorily high voltage having a negative polarity (which is equal to or less than the saturation voltage) to the LC layer 21, the LC molecules are aligned substantially in the second direction 21B as shown in FIG. 20(C). In this state, the spontaneous polarizations of the LC molecules are directed substantially in the same direction, and the LC exhibits the second ferroelectric phase.

Under the above-described conditions, the optical axis of the LC layer 21 extends in substantially the same direction as the first direction 21A or the second direction 21B.

As mentioned previously, the alignment order of the LC molecules forming the LC layer 21 is weakened at the interface between the LC layer 21 and the alignment films 18 and 19 by the aligning forces of the alignment films 18 and 19, and the LC molecules are able to easily move along imaginary cones. Moreover, the ferrielectric molecular orientational order is liable to disorder due to the surface effect at the interface between the LC layer 21 and the aligning films 18 and 19. When the intermediate voltage is applied to the LC layer 21, some LC molecules behave (move) along the imaginary cones traced by the molecules exhibiting the chiral smectic CA phase, and become tilted with respect to the major surfaces of the substrates 11 and 12, as shown in FIG. 7.

While a voltage is being applied to the LC layer 21, the LC layer exhibits the mixed phase wherein ferroelectric (or ferrielectric) fine domains in which adjacent LC molecules are aligned in the first direction 21A or the second direction 21B as shown in FIGS. 21(D) and 21(E), and the LC molecules tilted with respect to the substrate surfaces, are present in the LC layer 21. Since the LC layer 21 is thin and its thickness is on the order of 1.5 microns, the aligning forces of the alignment films 18 and 19 affect the LC molecules over the entirety of the thickness of the LC layer 21 such that the LC layer 21 exhibits the mixed phase over its entire thickness.

As the applied voltage is intensified, the number of LC molecules aligned in the first/second direction decreases, while the number of LC molecules aligned in the second/first direction increases. The number of LC molecules tilted with respect to the substrate surfaces also increases.

The above-mentioned mixed phase, wherein the LC molecules aligned in the first direction 21A, those aligned in the second direction 21B and those tilted with respect to the substrate surfaces are present over the entirety of the thickness of the LC layer 21, is as shown in FIG. 8.

In this mixed phase, the ratio between the number of LC molecules exhibiting the first ferroelectric phase, that of LC molecules exhibiting the second ferroelectric phase and that of LC molecules exhibiting the intermediate phase, and the mean alignment direction of the LC molecules exhibiting the intermediate phase (an alignment direction projected on the major surface of a substrate), vary continuously according to the polarity and value of the applied voltage.

Due to this, the director (the mean alignment direction of the LC molecules) of the LC vary continuously between the first and second directions 21A and 21B in accordance with the applied voltage, as shown in FIGS. 21(A) to 21(E).

(3) When the aligning forces are stronger than the intermolecular forces acting between the molecules forming the LC layer 21 and when the energy to align the LC molecules has an intermediate value between the value of the energy of the antiferroelectric molecular alignment and the value of the energy of the ferroelectric molecular alignment, some LC molecules become the intermediate state of being aligned having a tilt with respect to the major surfaces of the substrates on the cones traced by the molecules exhibiting the smectic CA phase, and the LC layer 21 exhibits the mixed phase. Since the thickness of the LC layer 21 is on the order of 1.5 microns, the aligning forces of the alignment films 18 and 19 affect even the LC molecules present in the central part of the LC molecules 21. Accordingly, the LC layer 21 exhibits the mixed phase over its entire thickness.

More strictly speaking, the LC layer 21 exhibits, over its entire thickness, the mixed phase wherein ferroelectric fine domains whose molecules are aligned in the first direction 21A or the second direction 21B, antiferroelectric fine domains whose molecules are aligned alternately in the first direction 21A and the second direction 21B, and the LC molecules aligned having a tilt with respect to the substrate surfaces, are mixed. In this case, an optical characteristic corresponding to the average of the characteristic of those fine domains is attained.

When a voltage is applied to the LC layer 21, the number of LC molecules aligned in the first direction 21A or the second direction 21B decreases, while the number of LC molecules aligned in the second direction 21B or the first direction 21A increases. The LC molecules which initially have a tilt with respect to the substrate surfaces are aligned in the second direction 21B or the first direction 21A. The number of tilted LC molecules also increases.

In this mixed phase, the ratio between the number of LC molecules exhibiting the antiferroelectric phase, that of LC molecules exhibiting the ferroelectric phase(s) and that of LC molecules exhibiting the intermediate phase, and the mean alignment direction of the LC molecules exhibiting the intermediate phase (an alignment direction projected on the major surface of a substrate) vary continuously according to the polarity and value of the applied voltage.

Due to this, the director (the mean alignment direction of the LC molecules) of the LC vary continuously between the first and second directions 21A and 21B in accordance with the applied voltage, as in the case of FIGS. 20(A) to 20(E).

By applying a satisfactorily high voltage having a positive polarity (which is equal to or greater than the saturation voltage) to the LC layer 21 which is in the mixed phase and whose molecules are aligned as shown in FIG. 21(A), the LC molecules are aligned substantially in the first direction 21A, as shown in FIG. 21(B). In this state, the spontaneous polarizations of the LC molecules are directed in substantially the same direction, and the LC exhibits the first ferroelectric phase.

By applying a satisfactorily high voltage having a negative polarity (which is equal to or less than the saturation voltage) to the LC layer 21, the LC molecules are aligned substantially in the second direction 21B as shown in FIG. 21(C). In this state, the spontaneous polarizations of the LC molecules are directed substantially in the same direction, and the LC exhibits the second ferroelectric phase.

Under the above-described conditions, the optical axis of the LC layer 21 extends in substantially the same direction as the first direction 21A or the second direction 21B.

Further, when an intermediate voltage is applied to the LC layer 21, the LC layer 21 becomes the state wherein fine domains containing the LC molecules aligned in the first direction 21A, those containing the LC molecules aligned in the second direction 21B, those containing the LC molecules aligned alternately in the first direction 21A and the second direction 21B, and those containing the LC molecules aligned having a tilt with respect to the major surfaces of the substrates, are mixed as shown in FIGS. 21(D) and 21(E).

Due to this, the director (the mean alignment direction of the LC molecules) of this LC vary continuously between the first and second directions 21A and 21B in accordance with the applied voltage, as shown in FIGS. 21(A) to 21(E).

In the case of any one of the above-described alignment characteristics (1) to (3), the director of the LC layer 21 is substantially coincident with the third direction 21C while no voltage is being applied to the LC layer 21. When a voltage is applied to the LC layer 21, the director varies continuously between the first direction 21A and the second direction 21B in accordance with the applied voltage. The movement of the director is smooth, since the LC layer 21 exhibits the mixed phase over its entire thickness.

When the optical characteristic of the LCD device having the above-described structure is shown in the form of a graph, it does not trace a horizontal line in the vicinity of an applied voltage of 0V, and smoothly varies continuously in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage is applied to the LC layer, the transmittance becomes saturated. Moreover, the hysteresis is considerably minor.

Particularly in case (3) where the LC layer 21 exhibits the mixed phase while no voltage is being applied thereto, the movement of the director of the LC layer 21 during the application of a low voltage is smooth, the hysteresis is minor, and a highly symmetrical V-shaped electro-optical characteristic (i.e., the electro-optical characteristic which describes a V-shaped line when it is shown in the form of a graph) is attained. This characteristic is suitable as that of an LCD device which performs multi-gradation display.

The LCD device (Example 6) has the electro-optical characteristic which is shown in FIG. 9A as the relationship between the applied voltage and the transmittance.

The LC layer 21 of this LCD device is formed of a liquid crystal whose main component is a liquid crystal composition which has been attained by processing the liquid crystal composition having the skeleton expressed in Chemical Formula 1 and having the properties shown in Table 1. The LC layer 21 is sealed with the cell gap being set at 1.5 microns and in the state wherein the helical structure traced by the LC molecules of the LC layer 21 has been broken.

The alignment films 18 and 19 of the above LCD device are formed of an organic high molecular compound such as polyimide, and are approximately 25 nm to 35 nm in thickness. The alignment films 18 and 19 have been subjected to rubbing. The surface energy dispersion forces (esd) of the alignment films 18 and 19 range from 38 to 41 dyn/cm, while the van der Waals forces (esp) of the alignment films 18 and 19 range from approximately 9 to 14 dyn/cm.

In the LCD device of Example 6, the LC layer 21 exhibits the mixed phase over its entire thickness. The applied voltage versus transmittance characteristic of the LCD device of Example 6 does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high. Applied voltages and transmittances are substantially in one-to-one correspondence with each other. This ensures the reliable display of halftones and high-contrast images.

Thus, the LC layer 21 of this embodiment exhibits the mixed phase over its entire thickness, and the director of the LC layer 21 varies continuously between the first direction 21A and the second direction 21B in accordance with the applied voltage. Therefore, an image can be displayed at the desired gradation.

In the above-described second to fifth embodiments, the arrangements of the transmission axes 23A and 24A of the lower and upper polarization plates 23 and 24 can be arbitrarily determined depending on the electro-optical characteristic of the required LCD device.

For example, in the case of employing an LC material whose cone angle θ is on the order of 22.5 degrees, the transmission axis 23A of the lower polarization plate 23 and the transmission axis 24A of the upper polarization plate 24 can be arranged as illustrated in FIG. 12A of the first embodiment. According to this structure, when a satisfactorily high negative voltage (which is equal to or greater than the threshold value) is applied to the LC layer 21, the director represents the second direction 21B such that the display becomes darkest. When a satisfactorily high positive voltage (which is equal to or greater than the threshold value) is applied to the LC layer 21, the director represents the first direction 21A, with the result that the display becomes brightest.

In the case of employing an LC material whose cone angle θ is larger than 22.5 degrees, for example, an LC material whose cone angle is 32 degrees as shown in Chemical Formula 1, the transmission axis 23A of the lower polarization plate 23 and the transmission axis 24A of the upper polarization plate 24 can be arranged as illustrated in FIG. 12B of the first embodiment. By adopting such an optical arrangement, the liquid crystal can be driven without setting it in a ferroelectric phase, so that the display burning phenomenon, etc. are prevented and the flicker is suppressed.

The relationship between the applied voltage and the transmittance was measured in regard to an LCD device in which the optical arrangement illustrated in FIG. 12B was applied to the above-described LC cell (formed by sealing, in a cell gap of 1.5 microns, a liquid crystal having the properties shown in Table 1 and containing, as the main component, a liquid crystal composition having the skeleton shown in Chemical Formula 1). The above relationship was measured by applying rectangular-waveform voltages between the opposite electrodes 13 and 17. As a result of the measurement, the same electro-optical characteristic as that shown in FIG. 13A of the first embodiment was attained.

According to the LCD devices of the Examples (of the present invention) described in the fifth embodiment, the applied voltage versus transmittance characteristic does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high.

In the above LCD devices, the LC layer 21 exhibits the mixed phase over its entire thickness. This ensures an excellent gradation displaying ability to the LCD devices.

The above LCD devices are driven by the same method as the LCD driving method of the first embodiment.

Moreover, these LCD devices can be driven using the data driver 32 illustrated in FIG. 16 of the first embodiment. Using such a data driver, an image can be reliably displayed at the desired gradation.

The present invention is not limited to the above-described embodiments, and various modifications and applications can be made. For example, the antiferroelectric liquid crystal of the present invention is not limited to one whose main component is a liquid crystal composition having the skeleton shown in Chemical Formula 1, and desired liquid crystals exhibiting other phases can be employed. The properties of the liquid crystal are also not limited to those described previously. The material, thickness, etc. of the alignment films can also be changed when needed.

Any combination of the LC material and the alignment films can be employed as far as the LC layer 21 is able to exhibit the mixed phase wherein the LC layer 21 contains LC molecules having a tilt, when no voltage is applied to the LC layer 21.

The thickness of the LC layer 21 can also be arbitrarily determined as far as the LC layer 21 is able to exhibit the mixed phase over the entire thickness. Even a liquid crystal layer, a part of which is not able to exhibit the mixed phase, can also be employed insofar as the presence of such a part hardly influences display.

Moreover, according to the fifth embodiment, the transmission axis 23A of the polarization plate 23 and the transmission axis 24A of the polarization plate 24 are arranged perpendicular to each other. However, the transmission axes 23A and 24A can be arranged parallel with each other. Further, the optical axes of the polarization plates may be absorption axes.

Furthermore, the present invention is not limited to an AFLC display device which adopts TFTs as active elements, and is applicable also to an AFLC display device which adopts MIMs as active elements.

The present invention is applicable also to a simple matrix (passive matrix) type display device in which scanning electrodes 71 and signal electrodes 72 perpendicular to the scanning electrodes 71 are arranged on the opposite surfaces of the substrates 11 and 12 facing each other, as illustrated in FIG. 17.

Sixth Embodiment

The LCD device of the sixth embodiment of the present invention will now be described.

The basic structure of the LCD device of the sixth embodiment is substantially the same as that of the LCD device of the first embodiment shown in FIGS. 1 to 4.

The LCD layer 21 of the sixth embodiment is formed of a liquid crystal whose main component is a liquid crystal composition having the skeleton shown in Chemical Formula 1, for example, and has the properties shown in Table 1. In the bulk state, the liquid crystal exhibits the chiral smectic CA (SmCA*) phase. Those matters are basically the same as those of the LCD device of the first embodiment.

In the sixth embodiment, however, the surface energy dispersion forces (esd) of the alignment films 18 and 19 range from approximately 30 to 50 dyn/cm, while the van der Waals forces (esp) range from approximately 3 to 20 dyn/cm.

In the sixth embodiment, the LC layer 21 is formed of such an LC material that (1) when no voltage is applied to the LC layer 21, those parts of the LC layer 21 which are located in the vicinity of the substrates 11 and 12 exhibit the mixed phase wherein the LC molecules exhibiting the ferroelectric and antiferroelectric phases are mixed or wherein the LC molecules exhibiting the ferroelectric or antiferroelectric phase and the LC molecules aligned in the smectic interlayer order and having a tilt with respect to the major surfaces of the substrates 11 and 12 are mixed, while the central part of the LC layer 21 exhibits a phase such as the antiferroelectric phase which differs from the above-described mixed phase; (2) when an intermediate voltage is applied to the LC layer 21, the tilt of the LC molecules tilted with respect to the major surfaces of the substrates is changed; and (3) when a satisfactorily high voltage is applied to the LC layer 21, the LC layer 21 exhibits the ferroelectric phase wherein the LC molecules are aligned substantially in the first direction 21A or the second direction 21B.

Such a liquid crystal, when sealed in the LC cell 25, is subjected to the interactions (surface effect) at the interface between the liquid crystal and the alignment films 18 and 19, in other words, the aligning forces conferred on the aligning films 18 and 19 through the alignment treatment. Because of the relationship between the aligning forces and the intermolecular forces acting between the molecules of the LC layer 21, those parts of the LC layer 21 which are located in the vicinity of the alignment films 18 and 19 exhibit the mixed phase. In the case where the aligning forces are stronger than the intermolecular forces to maintain the antiferroelectric phase of the molecules forming the LC layer 21, some of the LC molecules exhibiting the antiferroelectric phase when the liquid crystal is in the bulk state become the intermediate state of being aligned having a tilt with respect to the major surfaces of the substrates on the cones traced by the molecules exhibiting the smectic CA phase, while other LC molecules are reversed in the direction of the alignment and exhibit the ferroelectric phase(s). This results in the mixed phase wherein the LC molecules aligned having a tilt and those exhibiting the ferroelectric phase(s) are mixed. Those parts of the LC layer 21 which are located in the vicinity of the alignment films 18 and 19 exhibits the mixed phase wherein fine domains exhibiting the ferroelectric phase wherein adjacent LC molecules are aligned in the first direction 21A or the second direction 21B, fine domains exhibiting the antiferroelectric phase wherein adjacent LC molecules are aligned alternately in the first direction 21A and the second direction 21B, and the LC molecules having a tilt with respect to the substrate surfaces, are mixed. In this case, an optical characteristic corresponding to the average of the characteristics of those domains is attained.

Since the aligning forces of the alignment films 18 and 19 become weak in proportion to the square of distance, they do not exert a satisfactorily powerful influence on the central part of the LC layer 21 in the thickness direction of the LC layer 21. Because of this, the central part of the LC layer 21 exhibits the antiferroelectric phase wherein the LC molecules are aligned alternately in the first direction 21A and the second direction 21B.

Figure 22:
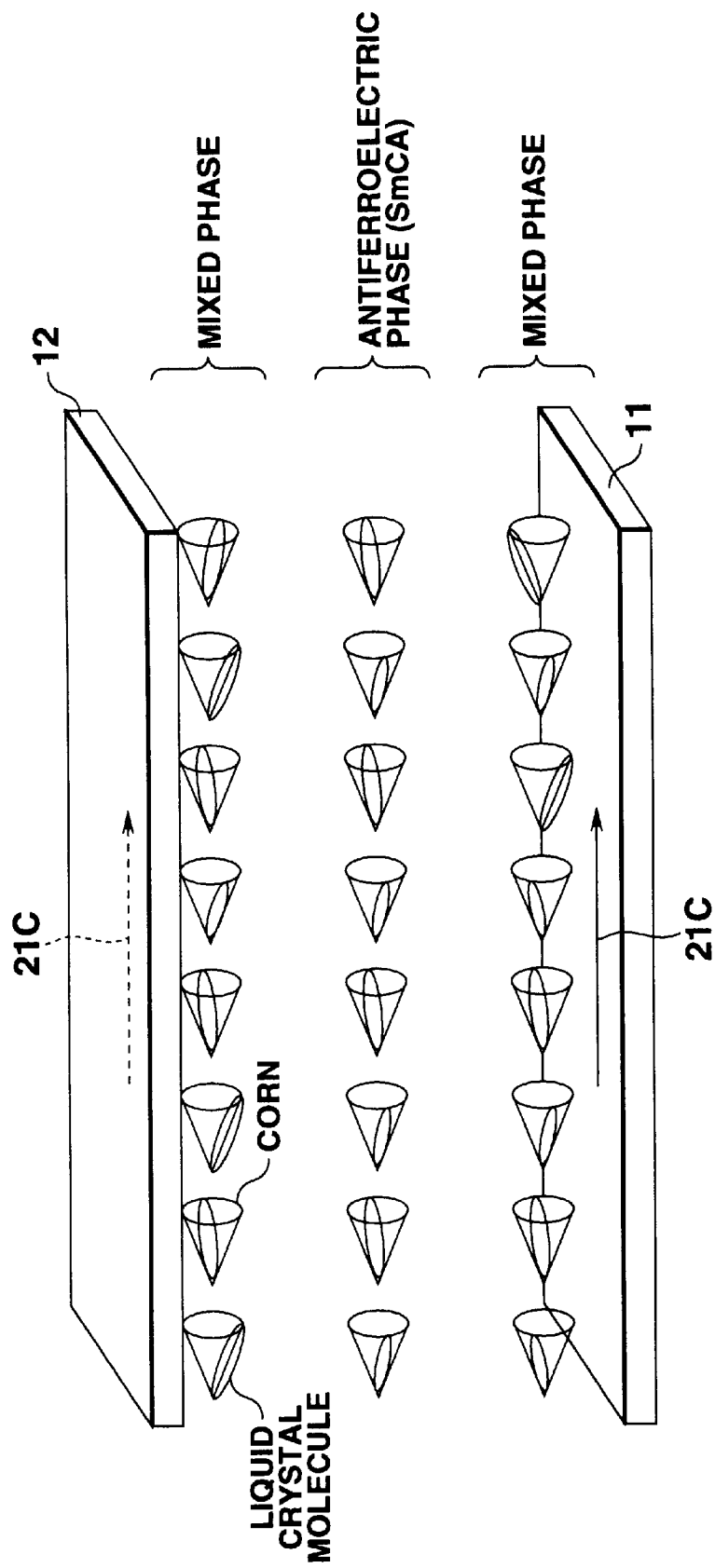
FIG. 22 is a diagram for explaining the state of the alignment of the liquid crystal molecules while no voltage is being applied thereto.
Figure 23:
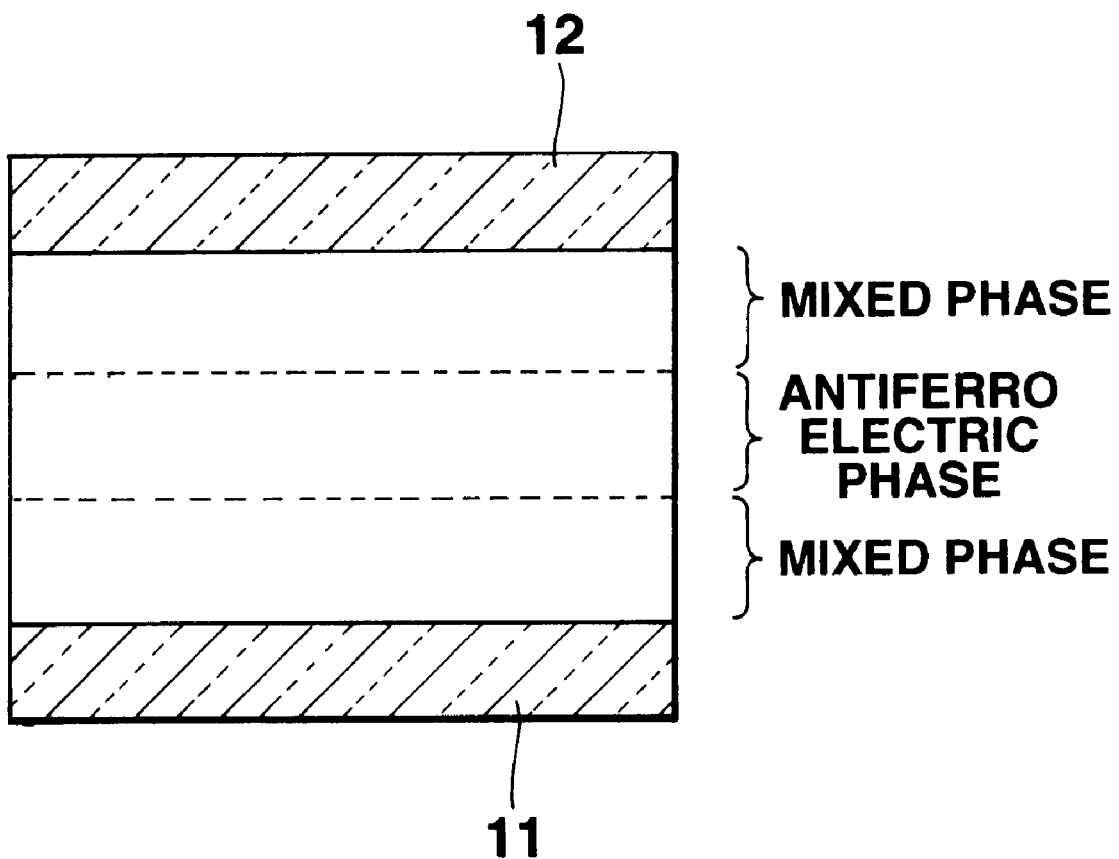
FIG. 23 is a diagram for explaining the structure of the liquid crystal layer while no voltage is being applied thereto.

FIG. 22 shows the alignment state of the LC molecules when those parts of the LC layer 21 which are located in the vicinity of the alignment films 18 and 19 exhibit the mixed phase, while the central part of the LC layer 21 exhibits the ferroelectric phase(s). FIG. 23 shows the layer structure of the LC layer 21.

When a voltage is applied to the LC layer 21, the number of LC molecules aligned in the first direction 21A or the second direction 21B decreases and the number of LC molecules aligned in the second direction 21B or the first direction 21A increases in the vicinity of the alignment film 18 and 19, in accordance with the polarity of the applied voltage. The LC molecules which initially have a tilt with respect to the substrate surfaces are aligned in the second or first direction. The number of tilted LC molecules also increases.

The gap in potential energy between the antiferroelectric and ferroelectric phases is small. When a low voltage is applied to the LC layer 21, therefore, some LC molecules behave (move) along the imaginary cones traced by the molecules exhibiting the chiral smectic CA phase, and become tilted with respect to the major surfaces of the substrates 11 and 12.

In this mixed phase, the ratio between the number of LC molecules exhibiting the antiferroelectric phase, that of LC molecules exhibiting the ferroelectric phase(s) and that of LC molecules in the intermediate state, and the mean alignment direction of the LC molecules in the intermediate state (an alignment direction projected on the major surface of a substrate) vary continuously according to the polarity and value of the applied voltage.

When a satisfactorily high voltage having a positive polarity (which is equal to or greater than the saturation voltage) is applied to the LC layer 21, the LC molecules are aligned substantially in the first direction 21A. In this state, the spontaneous polarizations of the LC molecules are directed in substantially the same direction, and the LC exhibits the first ferroelectric phase.

When a satisfactorily high voltage having a negative polarity (which is equal to or less than the saturation voltage) is applied to the LC layer 21, the LC molecules are aligned substantially in the second direction 21B. In this state, the spontaneous polarizations of the LC molecules are directed substantially in the same direction, and the LC exhibits the second ferroelectric phase.

Under the above-described conditions, the optical axis of the LC layer 21 extends in substantially the same direction as the first direction 21A or the second direction 21B.

Figure 24:
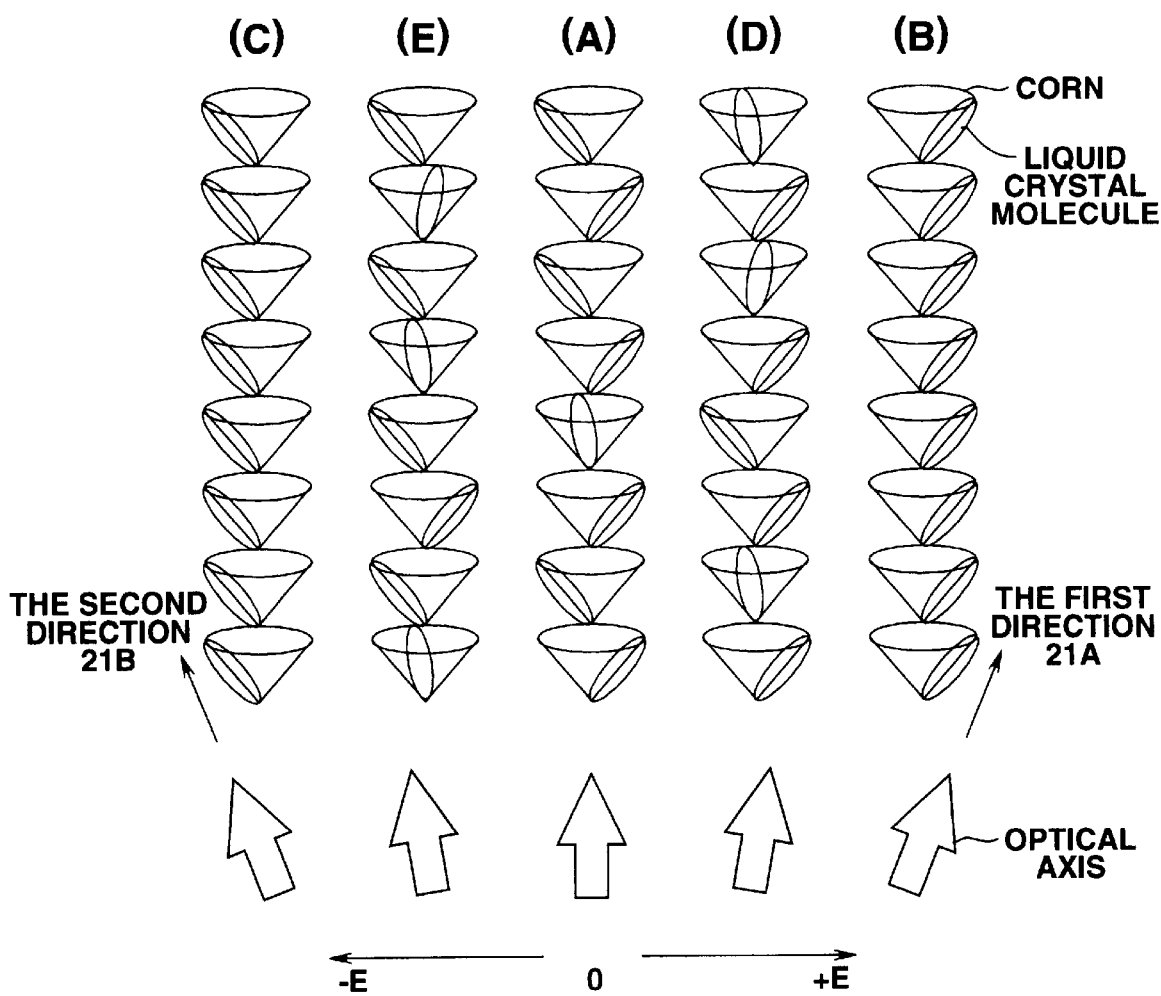
FIG. 24 is a diagram for explaining variations which occur in the state of the alignment of the liquid crystal molecules according to the applied voltage.

The director (the mean alignment direction of the LC molecules) of the LC is as shown in FIGS. 24(A) to 24(E). While no voltage is being applied to the LC layer 21, the director represents the direction 21C of the normal line of the smectic layers, as shown in FIG. 24(A). The direction of the director varies continuously between the first and second directions 21A and 21B in accordance with the applied voltage.

When the optical characteristic is shown in the form of a graph, it does not trace a horizontal line in the vicinity of an applied voltage of 0V, and smoothly varies continuously in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage is applied to the LC layer, the transmittance becomes saturated.

Figure 25:
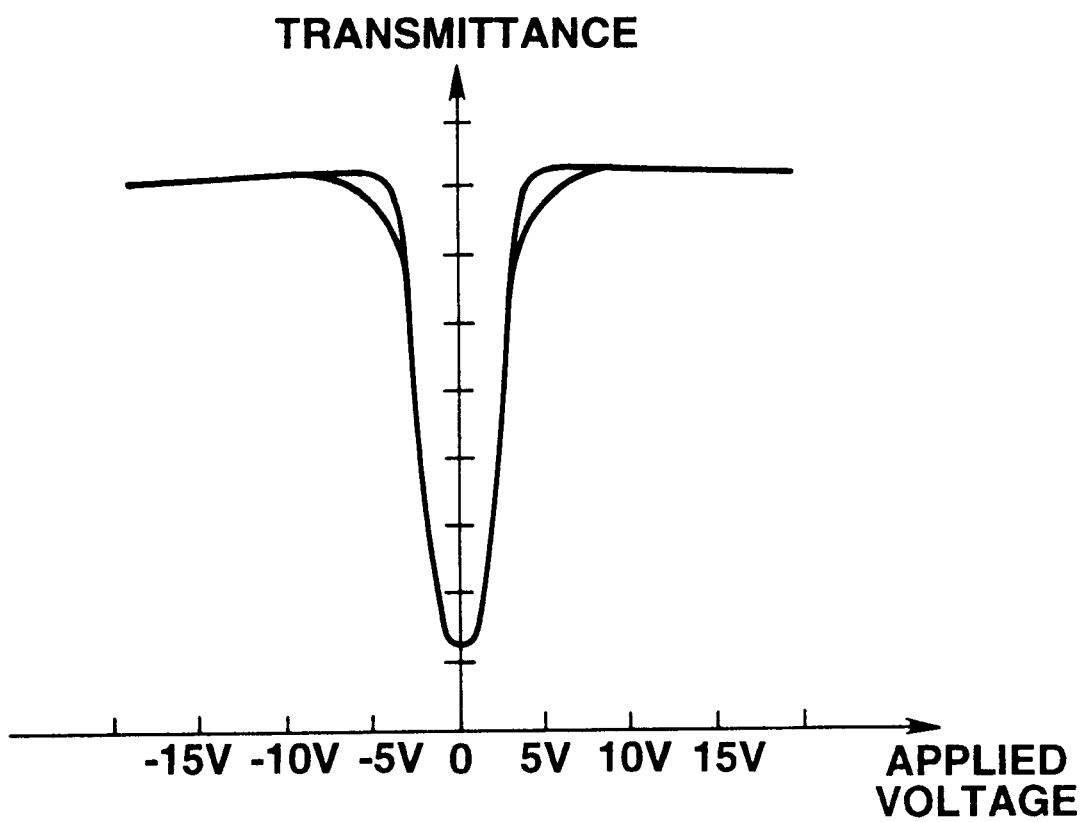
FIG. 25 is a graph showing the relationship between the applied voltage and the transmittance when a low frequency voltage having a rectangular waveform is applied to the antiferroelectric liquid crystal display device of Example 7 (according to the present invention) which employs the optical arrangement illustrated in FIG. 3.

The LCD device (Example 7) according to this embodiment has the electro-optical characteristic which is shown in FIG. 25 as the relationship between the applied voltage and the transmittance.

The LC layer 21 of this LCD device is formed of a liquid crystal whose main component is a liquid crystal composition which has been attained by processing the liquid crystal composition having the skeleton expressed in Chemical Formula 1 and having the properties shown in Table 1. The LC layer 21 is sealed with the cell gap being set at 1.5 microns and in the state wherein the helical structure traced by the LC molecules of the LC layer 21 has been broken.

The alignment films 18 and 19 of the above LCD device are formed of an organic high molecular compound such as polyimide, and are approximately 25 nm to 35 nm in thickness. The alignment films 18 and 19 have been subjected to rubbing. The surface energy dispersion forces (esd) of the alignment films 18 and 19 range from 38 to 41 dyn/cm, while the van der Waals forces (esp) of the alignment films 18 and 19 range from approximately 9 to 14 dyn/cm.

As shown in FIG. 25, the applied voltage versus transmittance characteristic of the LCD device of Example 7 does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high. Applied voltages and transmittances are substantially in one-to-one correspondence with each other. This ensures the reliable display of halftones and high-contrast images.

Thus, while no voltage is being applied to the LC layer 21, those parts of the LC layer 21 which are located in the vicinity of the alignment films 18 and 19 exhibit the mixed phase. When a voltage is applied to the LC layer 21, the entirety of the LC layer 21 exhibits the mixed phase. The director of the LC layer 21 varies continuously between the first direction 21A and the second direction 21B in accordance with the applied voltage. Therefore, an image can be displayed at the desired gradation.

The arrangements of the transmission axes 23A and 24A of the lower and upper polarization plates 23 and 24 can be arbitrarily determined depending on the electro-optical characteristic of the required LCD device.

For example, in the case of employing an LC material whose cone angle θ is on the order of 22.5 degrees, the transmission axis 23A of the lower polarization plate 23 and the transmission axis 24A of the upper polarization plate 24 can be arranged as illustrated in FIG. 12A of the first embodiment. According to this structure, when a satisfactorily high negative voltage (which is equal to or greater than the threshold value) is applied to the LC layer 21, the director represents the second direction 21B such that the display becomes darkest. When a satisfactorily high positive voltage (which is equal to or greater than the threshold value) is applied to the LC layer 21, the director represents the first direction 21A, with the result that the display becomes brightest.

In the case of employing an LC material whose cone angle θ is larger than 22.5 degrees, for example, an LC material whose cone angle is 32 degrees as shown in Chemical Formula 1, the transmission axis 23A of the lower polarization plate 23 and the transmission axis 24A of the upper polarization plate 24 can be arranged as illustrated in FIG. 12B of the first embodiment. By adopting such an optical arrangement, the liquid crystal can be driven without setting it in a ferroelectric phase, so that the display burning phenomenon, etc. are prevented and the flicker is suppressed.

The relationship between the applied voltage and the transmittance was measured in regard to an LCD device in which the optical arrangement illustrated in FIG. 12B was applied to the above-described LC cell (formed by sealing, in a cell gap of 1.5 microns, a liquid crystal having the properties shown in Table 1 and containing, as the main component, a liquid crystal composition having the skeleton shown in Chemical Formula 1). The above relationship was measured by applying rectangular-waveform voltages between the opposite electrodes 13 and 17. As a result of the measurement, the electro-optical characteristic shown in FIG. 26 was attained.

Figure 26:
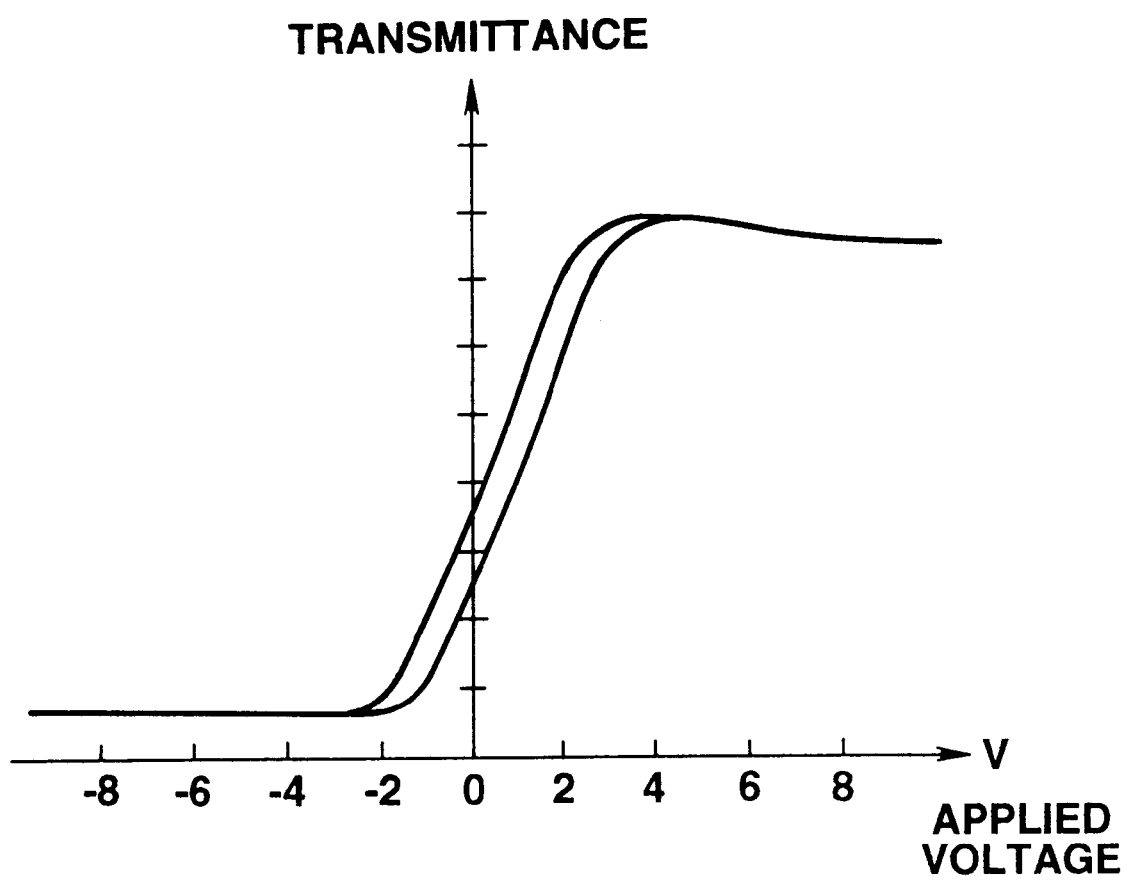
FIG. 26 is a diagram showing the relationship between the applied voltage and the transmittance when a low frequency voltage having a rectangular waveform is applied to the antiferroelectric liquid crystal display device of Example 8 (according to the present invention) which employs the optical arrangement illustrated in FIG. 12B.

According to the LCD device of Example 8, as shown in FIG. 26, the applied voltage versus transmittance characteristic does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast is high.

It can be understood from FIG. 26 that the above LCD device has an excellent gradation display ability.

In this embodiment, the thickness of the LC layer 21 is 1.5 microns. While no voltage is being applied to the LC layer 21, those parts of the LC layer 21 which are located in the vicinity of the substrates exhibit the mixed phase. When a voltage is applied to the LC layer, also the central part of the LC layer 21 exhibits the mixed phase. However, the thickness of the LC layer 21 may be much greater than the above, and the central part of the LC layer 21 may exhibit no mixed phase even when a voltage is applied to the LC layer 21.

In this case, the thickness of the LC layer 21 is set at approximately 5 microns, for example. When the LC layer 21 is thus thick, the LC layer 21 is sealed between the substrates in the state wherein the double helical structure traced by the LC molecules exhibiting the chiral smectic CA phase is maintained.

However, since the alignment forces due to the surface effect occurring at the interface between the liquid crystal and the alignment films affect the LC molecules present in the vicinity of the alignment films 18 and 19, the double helical structure traced by those molecules is broken such that those parts of the LC layer 21 which are located in the vicinity of the alignment films 18 and 19 exhibit the mixed phase. Meanwhile, the alignment forces do not affect the LC molecules forming the central part of the LC layer 21.

Therefore, the central part of the LC layer 21 remains in the chiral smectic CA phase wherein LC molecules trace the double helical structure.

Figure 27A:
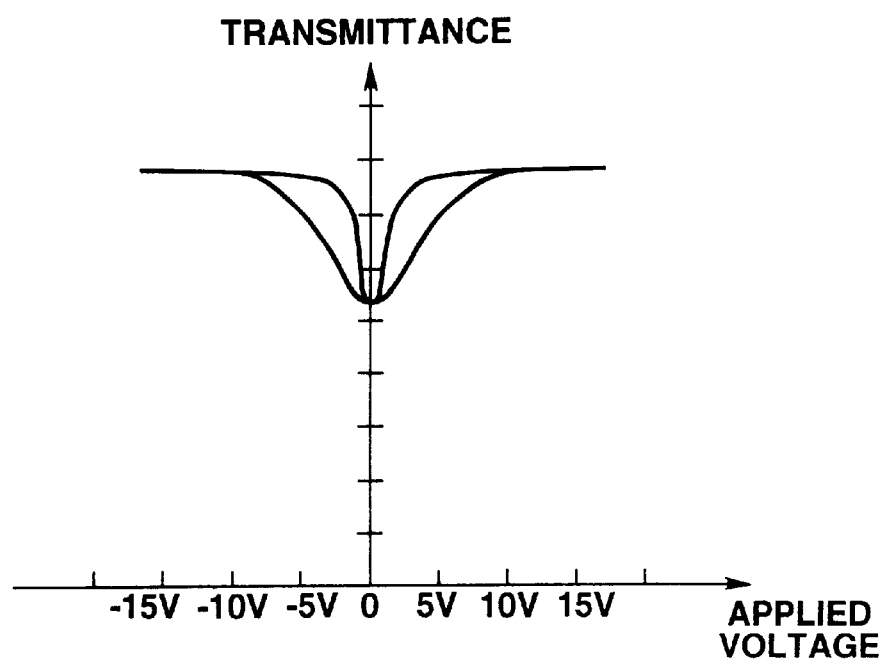
FIG. 27A is a diagram showing the relationship between the applied voltage and the transmittance when a low frequency voltage having a rectangular waveform is applied to the antiferroelectric liquid crystal display device of Example 9 (according to the present invention) which employs the optical arrangement illustrated in FIG. 12B.

FIG. 27A shows the relationship between the applied voltage and the transmittance when rectangular-waveform voltages are applied between the opposite electrodes 13 and 17 of an LCD device (Example 9) employing the LC layer 21 having the above-described structure.

This LCD device is formed of formed of a liquid crystal whose main component is a liquid crystal composition which has been attained by processing the liquid crystal composition having the skeleton expressed in Chemical Formula 1 and having the properties shown in Table 1. The LC layer 21 is sealed with the cell gap being set at 1.5 microns and in the state wherein the helical structure traced by the LC molecules of the LC layer 21 has been broken.

The alignment films 18 and 19 of the above LCD device are formed of an organic high molecular compound such as polyimide, and are approximately 25 nm to 35 nm in thickness. The alignment films 18 and 19 have been subjected to rubbing. The surface energy dispersion forces (esd) of the alignment films 18 and 19 range from 38 to 41 dyn/cm, while the van der Waals forces (esp) of the alignment films 18 and 19 range from approximately 9 to 14 dyn/cm.

Figure 27B:
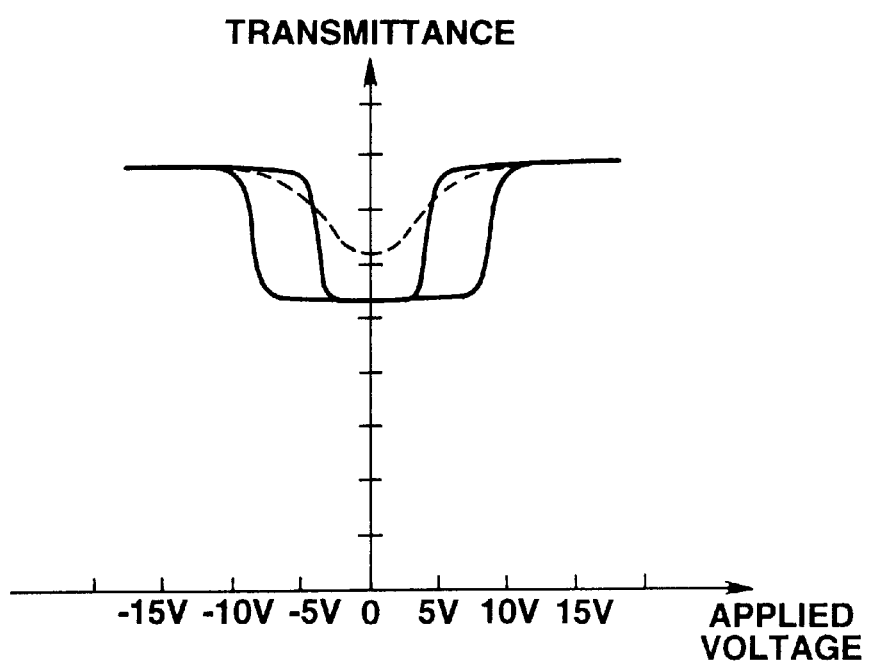
FIG. 27B is a diagram for explaining the reason the characteristic shown in FIG. 27A has been attained.

The characteristic depicted in FIG. 27A is the combination of the characteristic represented by solid lines in FIG. 27B and that represented by a discontinuous line in FIG. 27B. The tri-stable characteristic represented by solid lines in FIG. 27B is one attained in regard to the central part of the LC layer, and exhibits a remarkable hysteresis. The characteristic represented by a discontinuous V-shaped line in FIG. 27B is one attained in regard to only those parts of the LC layer which are located in the vicinity of the alignment films 18 and 19.

According to the applied voltage versus transmittance characteristic shown in FIG. 27A, the transmittance varies continuously, the curve representing the characteristic when positive voltages are applied to the LC layer and the curve representing the characteristic when negative voltages are applied to the LC layer are symmetrical, the hysteresis is relatively minor, and the contrast is high, as in the case of the characteristic shown in FIG. 25. Applied voltages and transmittances are substantially in one-to-one correspondence with each other. This ensures the reliable display of halftones and high-contrast images.

The LCD device having the above-described structure is driven using the same method as the LCD device driving method of the first embodiment.

Figure 28:
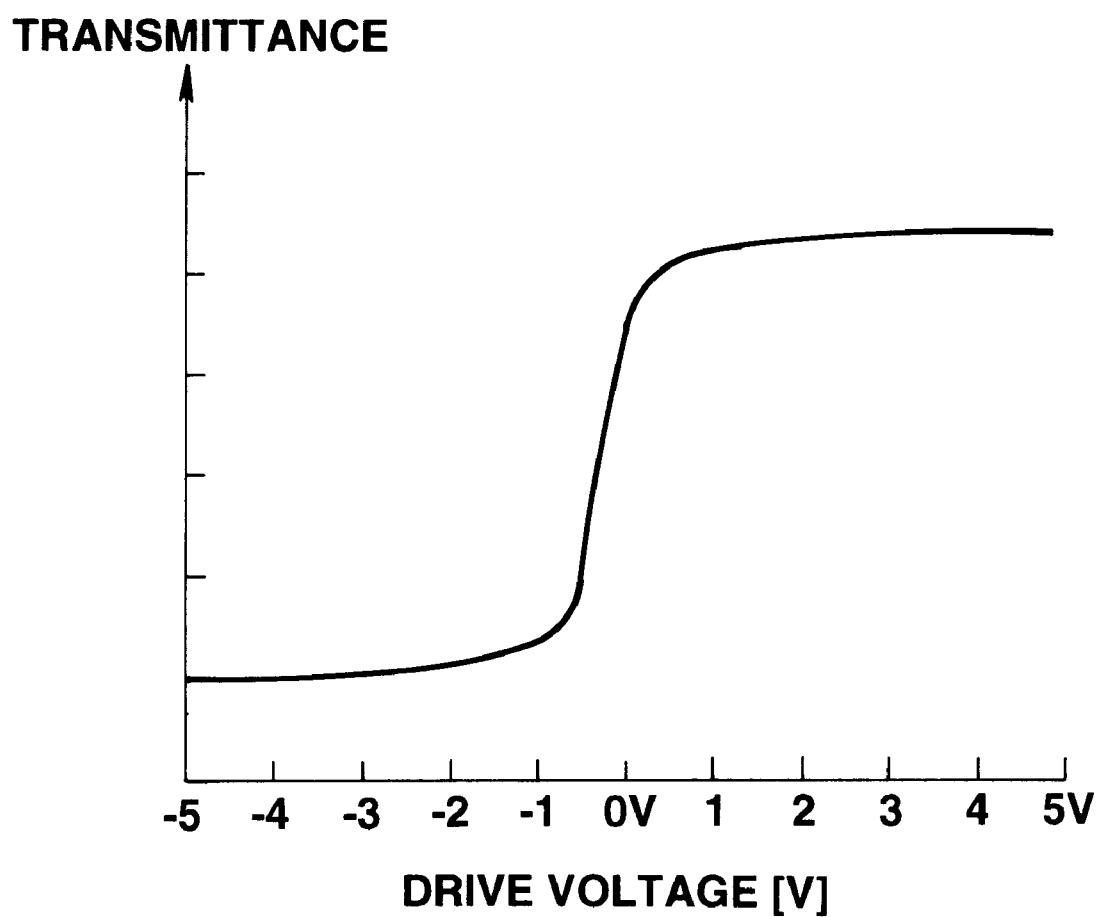
FIG. 28 is a diagram showing the relationship between the applied voltage and the transmittance when the liquid crystal display device of Example 9 (according to the present invention) is driven using the driving method shown in FIGS. 14A to 14C.

FIG. 28 shows variations in the transmittance when the LCD device of Example 9 is driven by the driving method shown in FIGS. 14A and 14B, and when the voltage of the data signal is increased sequentially from −5V to +5V and is lowered sequentially from +5V to −5V. It can be understood from FIG. 28 that an image can be reliably displayed at the desired gradation by employing the driving method shown in FIGS. 14A and 14B.

Moreover, the data driver of this LCD device can be formed having the same structure as the data driver 32 illustrated in FIG. 16 of the first embodiment. Using this data driver, an image can be reliably displayed at the desired gradation.

The present invention is not limited to the above-described embodiments, and various modifications and applications can be made. For example, the antiferroelectric liquid crystal of the present invention is not limited to one whose main component is a liquid crystal composition having the skeleton shown in Chemical Formula 1, and desired liquid crystals exhibiting other phases can be employed. The properties of the liquid crystal are also not limited to those described previously. The material, thickness, etc. of the alignment films can also be changed when needed.

Any combination of the LC material and the alignment films can be employed as far as those parts of the LC layer 21 which are located in the vicinity of the alignment films are able to exhibit the mixed phase wherein the LC molecules having a tilt are contained while no voltage is being applied to the LC layer 21.

In the above-described embodiments, the transmission axis 23A of the polarization plate 23 and the transmission axis 24A of the polarization plate 24 are arranged perpendicular to each other. However, the transmission axes 23A and 24A can be arranged parallel with each other. Further, the optical axes of the polarization plates may be absorption axes.

Furthermore, the present invention is not limited to an AFLC display device which adopts TFTs as active elements, and is applicable also to an AFLC display device which adopts MIMs as active elements.

The present invention is applicable also to a simple matrix (passive matrix) type display device in which scanning electrodes 71 and signal electrodes 72 perpendicular to the scanning electrodes 71 are arranged on the opposite surfaces of the substrates 11 and 12 facing each other, as illustrated in FIG. 17.

Thus, although the LCD device of the present invention employs an antiferroelectric liquid crystal, it can continuously change a display gradation and can display an image at the desired gradation.

What is claimed is:

1. A liquid crystal display device comprising:
a first substrate on which first electrodes are formed;
a second substrate on which a second electrode is formed facing said first electrodes;
a liquid crystal layer sealed between said first and second substrates, and formed of a smectic liquid crystal which exhibits a mixed phase, said mixed phase containing a plurality of phases which differ from each other in an alignment order of liquid crystal molecules forming adjoining smectic layers, wherein an alignment of said liquid crystal molecules in said mixed phase changes in accordance with a change of an applied voltage, an average alignment direction of said liquid crystal molecules aligned in each of said phases which consists of said mixed phase is changed continuously, and a director of said liquid crystal layer changes continuously; and
director changing means for continuously changing a director of said liquid crystal layer by controlling the alignment of liquid crystal molecules exhibiting said mixed phase.

2. The liquid crystal display device according to claim 1, wherein said plurality of phases differ from each other in the alignment of liquid crystal molecules which are in a plane substantially parallel with said first and second substrates.

3. The liquid crystal display device according to claim 1, wherein an electric field applied between said first and second substrates induces said mixed phase.

4. The liquid crystal display device according to claim 1, wherein said mixed phase contains at least one of ferroelectric, antiferroelectric and ferrielectric phases.

5. The liquid crystal display device according to claim 1, wherein:
said liquid crystal layer is formed of a smectic liquid crystal having spontaneous polarization; and
at least one of said first and second substrates comprises alignment means having aligning forces to align liquid crystal molecules of said liquid crystal layer, said aligning forces being weaker than interactions acting between smectic layers contained in said liquid crystal layer.

6. The liquid crystal display device according to claim 1, wherein:
said liquid crystal layer is formed of a liquid crystal material which exhibits a chiral smectic phase while said liquid crystal material is in a bulk state, and which exhibits an antiferroelectric phase when said liquid crystal material is sealed between said first and second substrates; and
said director changing means includes means for applying, between said first and second electrodes, a voltage for changing said antiferroelectric phase to said mixed phase and controlling the alignment of the liquid crystal molecules exhibiting said mixed phase in order to change the director of said liquid crystal layer.

7. The liquid crystal display device according to claim 1, wherein:
said liquid crystal layer sealed between said first and second substrates is formed of a smectic liquid crystal which exhibits an antiferroelectric phase while said liquid crystal is in a bulk state, and which has spontaneous polarization.

8. The liquid crystal display device according to claim 7, wherein said alignment means includes alignment films which have aligning forces to align liquid crystal molecules of said liquid crystal layer, said aligning forces being substantially equal to interactions acting between smectic layers contained in said liquid crystal layer.

9. The liquid crystal display device according to claim 7, wherein:
said alignment means have aligning forces to change a phase of said liquid crystal layer to a ferrielectric phase;
when said liquid crystal layer is sealed between said first and second substrates, the phase of said liquid crystal layer is changed to the ferrielectric phase by said aligning forces; and
said director changing means includes means for applying, between said first and second electrodes, a voltage for changing said ferrielectric phase to said mixed phase and controlling the alignment of the liquid crystal molecules exhibiting said mixed phase in order to change the director of said liquid crystal layer.

10. The liquid crystal display device according to claim 1, wherein:
said liquid crystal layer sealed between said first and second substrates is formed of a smectic liquid crystal which exhibits an antiferroelectric phase while said liquid crystal is in a bulk state, and which has spontaneous polarization; and
at least one of said first and second substrates comprises alignment means for changing a phase of said liquid crystal layer to said mixed phase.

11. The liquid crystal display device according to claim 10, wherein said alignment means includes alignment films which have aligning forces to align liquid crystal molecules of said liquid crystal layer, said aligning forces being stronger than interactions acting between smectic layers contained in said liquid crystal layer.

12. The liquid crystal display device according to claim 11, wherein said liquid crystal layer is formed of a chiral smectic liquid crystal which exhibits an antiferroelectric phase while said liquid crystal is in a bulk state, and which exhibits said mixed phase when said liquid crystal is sealed between said first and second substrate.

13. The liquid crystal display device according to claim 1, wherein said mixed phase contains the phase having the liquid crystal molecules aligned parallel with major surfaces of said first and second substrates, and having said aligned liquid crystal molecules tilted at a predetermined angle with respect to the major surfaces of said first and second substrates.

14. The liquid crystal display device according to claim 13, wherein said mixed phase contains at least one of ferroelectric, antiferroelectric and ferrielectric phases, and liquid crystal molecules in said mixed phase which move along cones traced by molecules exhibiting a chiral smectic phase and which are aligned being tilted at a predetermined angle with respect to the major surfaces of said first and second substrates.

15. The liquid crystal display device according to claim 14, wherein:

said liquid crystal layer while in a bulk state exhibits the antiferroelectric phase; and in states in which said liquid crystal layer is sealed between said first and second substrates and in which a voltage is applied between said first and second electrodes, said liquid crystal layer contains the liquid crystal molecules aligned being tilted with respect to the major surfaces of said first and second substrates.

16. The liquid crystal display device according to claim 1, wherein said liquid crystal layer has a thickness to permit said liquid crystal layer, when sealed between said first and second substrates, to exhibit said mixed phase over the entirety of the thickness.

17. The liquid crystal display device according to claim 1, further comprising:

driving means for applying a voltage to said liquid crystal exhibiting said mixed phase, through active elements connected to said first electrodes or said second electrode, thereby moving liquid crystal molecules along cones traced by molecules exhibiting a chiral smectic phase, in order to control the director of said liquid crystal layer to perform gradation display.

18. A liquid crystal display device comprising:

a first substrate on which first electrodes are formed:

a second substrate on which a second electrode is formed facing said first electrodes:

a liquid crystal layer formed of a smectic liquid crystal which exhibits a mixed phase when said liquid crystal is sealed between said first and second substrates, said liquid crystal in said mixed phase containing liquid crystal molecules aligned in a plurality of alignment states which differ from each other in an alignment order of liquid crystal molecules forming adjoining smectic layers, wherein said liquid crystal layer comprises three layers, two of said three layers being located in a vicinity of said first and second substrates and exhibiting said mixed phase, and the remaining one of said three layers being an intermediate layer which is separated from said first and second substrates and is sandwiched between said two layers and exhibits a phase other than said mixed phase; and director changing means for changing a director of said liquid crystal layer by controlling the alignment of liquid crystal molecules exhibiting said mixed phase.

19. The liquid crystal display device according to claim 17, wherein each of cones traced by molecules exhibiting a chiral smectic CA phase has an axis and forms a cone angle with said axis, and the director of said liquid crystal layer in said mixed phase is moved by said driving means through an angle smaller than a maximum value of said cone angle, in order to perform the gradation display without changing said mixed phase to a uniform ferroelectric phase.

20. A method for driving a liquid crystal display device, comprising steps of:

sealing a liquid crystal layer between first and second substrates, said liquid crystal layer being formed of a liquid crystal which exhibits a chiral smectic phase while said liquid crystal is in a bulk state and which exhibits a mixed phase, said mixed phase containing a plurality of phases which differ from each other in an alignment order of liquid crystal molecules forming adjoining smectic layers, wherein an alignment of said liquid crystal molecules in said mixed phase changes in accordance with change of an applied voltage, an average alignment direction of said liquid crystal molecules aligned in each of said phases which consists of said mixed phase is changed continuously, and a director of said liquid crystal layer changes continuously; and applying a voltage to said liquid crystal layer, thereby moving liquid crystal molecules exhibiting said mixed phase along cones traced by molecules exhibiting a chiral smectic CA phase, in order to control said director of said liquid crystal layer in said mixed phase and perform gradation display.

21. The method according to claim 20, wherein each of cones traced by molecules exhibiting a chiral smectic CA phase has an axis and forms a cone angle with said axis, and the director of said liquid crystal layer in said mixed phase is moved through an angle smaller than a maximum value of said cone angle, in order to perform the gradation display without changing said mixed phase to a uniform ferroelectric phase.

* * * * *